US012588022B2

(12) United States Patent
Robin et al.

(10) Patent No.:   US 12,588,022 B2
(45) Date of Patent:        Mar. 24, 2026

(54) CHANNEL MAP ALLOCATION TO SUBFRAMES IN PERIODIC ADVERTISEMENT WITH RESPONSE

(71) Applicant: QUALCOMM Incorporated, San Diego, CA (US)

(72) Inventors: Robin Robin, Noida (IN); Nicolas Graube, Cambridge (GB); Deep Shikha Aggarwal, Gurugram (IN); Sonu Lnu, Faridabad (IN); Rahul Sangwan, Charkhi Dadri (IN); Maitreyi Gupta, Delhi (IN); Randhir Kumar, New Delhi (IN)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 18/324,681

(22) Filed: May 26, 2023

(65) Prior Publication Data

US 2024/0397509 A1     Nov. 28, 2024

(51) Int. Cl.
*H04W 72/1268*          (2023.01)
*H04W 72/23*            (2023.01)

(52) U.S. Cl.
CPC ....... *H04W 72/1268* (2013.01); *H04W 72/23* (2023.01)

(58) Field of Classification Search
CPC ........................... H04W 72/23; H04W 72/1268
USPC ......................................................... 370/329
See application file for complete search history.

(56)                    References Cited

U.S. PATENT DOCUMENTS

2024/0397509 A1*   11/2024   Robin ................... H04W 8/005
2025/0081035 A1*    3/2025   Sangwan ............ H04W 28/065
2025/0175913 A1*    5/2025   Robin ................... H04W 48/08

FOREIGN PATENT DOCUMENTS

WO        2024103326 A1      5/2024

OTHER PUBLICATIONS

International Search Report and Written Opinion—PCT/US2024/023931—ISA/EPO—Jun. 26, 2024.
(Continued)

*Primary Examiner* — Peter G Solinsky
(74) *Attorney, Agent, or Firm* — QUALCOMM Incorporated

(57)                    ABSTRACT

Systems and techniques are provided for wireless communications. For example, a process can include transmitting, to a network entity, first channel map information of a wireless communication device, wherein the first channel map information includes one or more channels associated with the wireless communication device. A process can include receiving, from the network entity, an identifier of a particular subframe of a plurality of subframes and a subframe channel map of the particular subframe, wherein the wireless communication device is allocated to the particular subframe based on a comparison of the one or more channels included in the first channel map information and one or more channels included in the subframe channel map of the particular subframe. A process can include transmitting, to the network entity, a periodic advertisement (PA) response using a channel included in the subframe channel map of the particular subframe.

28 Claims, 10 Drawing Sheets

900

(56) References Cited

OTHER PUBLICATIONS

Woolley M., "Bluetooth Core Specification Version 5.4", Version 1.0.0, Feb. 7, 2023, XP093175129, pp. 1-43, figure 9, p. 18-p. 31.
Woolley M., "The Bluetooth Low Energy Primer", Version 1.1.0, Jan. 17, 2023, XP093099960, 79 pages, p. 5, p. 19-p. 47, figures 15,23,24.

* cited by examiner

100

800

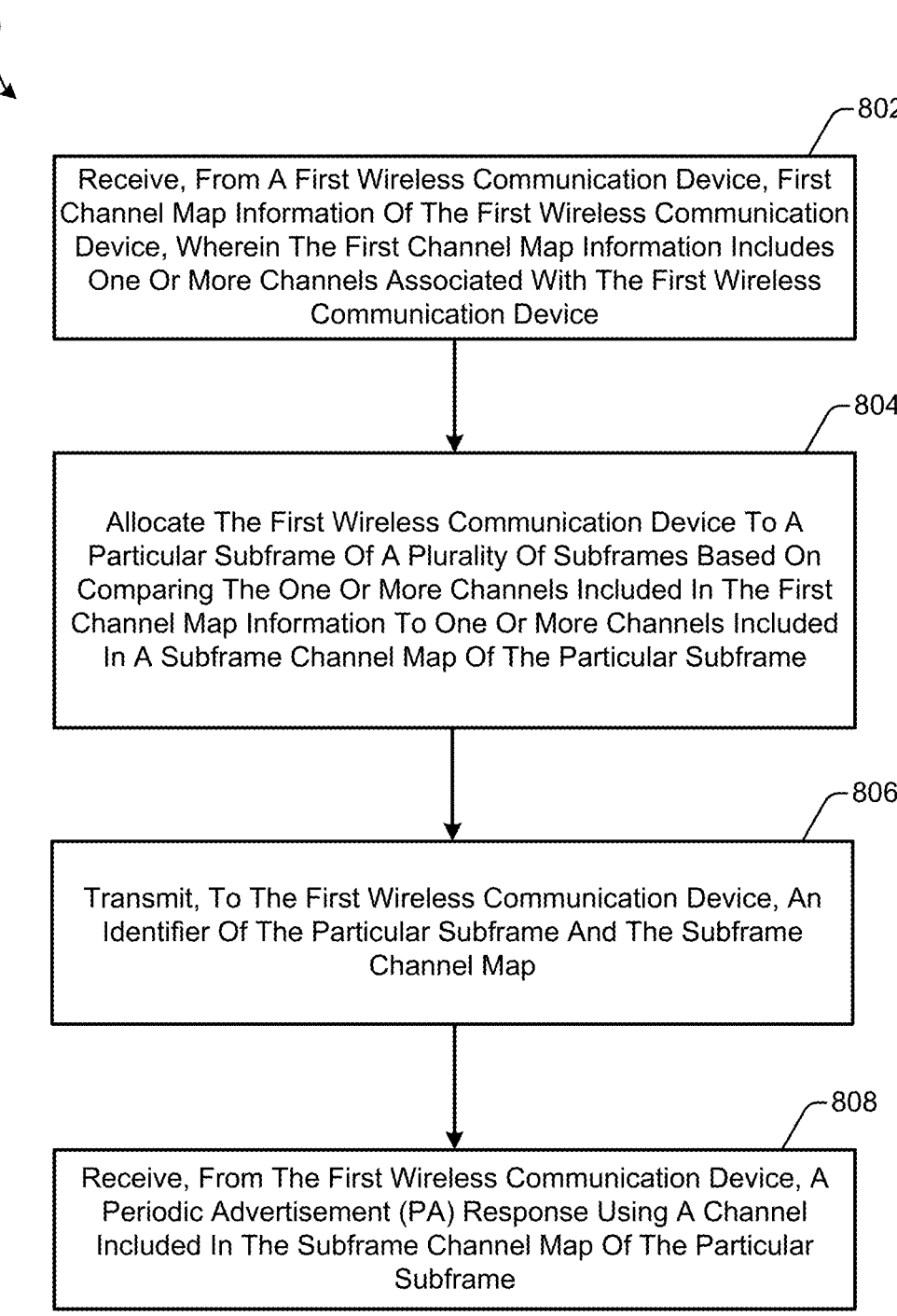

802

Receive, From A First Wireless Communication Device, First Channel Map Information Of The First Wireless Communication Device, Wherein The First Channel Map Information Includes One Or More Channels Associated With The First Wireless Communication Device

804

Allocate The First Wireless Communication Device To A Particular Subframe Of A Plurality Of Subframes Based On Comparing The One Or More Channels Included In The First Channel Map Information To One Or More Channels Included In A Subframe Channel Map Of The Particular Subframe

806

Transmit, To The First Wireless Communication Device, An Identifier Of The Particular Subframe And The Subframe Channel Map

808

Receive, From The First Wireless Communication Device, A Periodic Advertisement (PA) Response Using A Channel Included In The Subframe Channel Map Of The Particular Subframe

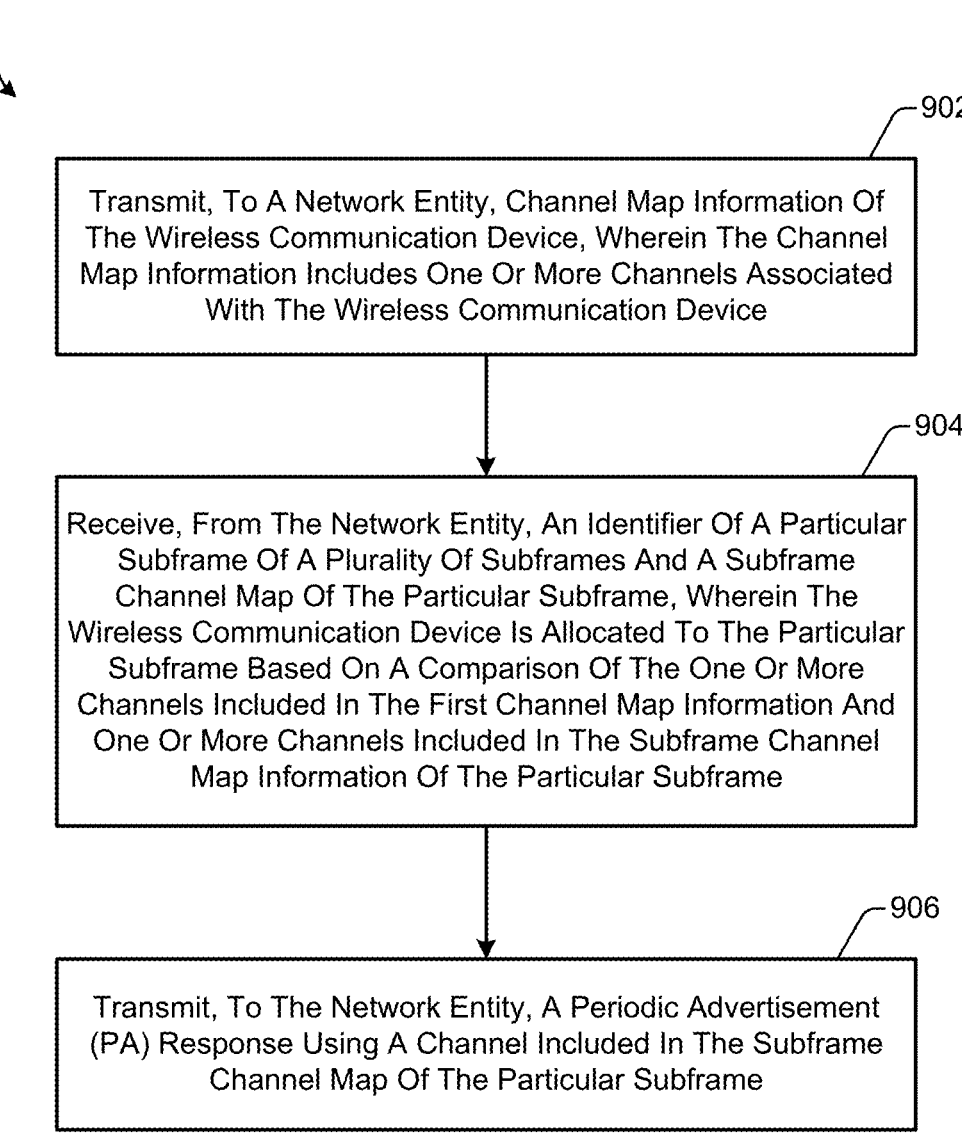

902

Transmit, To A Network Entity, Channel Map Information Of The Wireless Communication Device, Wherein The Channel Map Information Includes One Or More Channels Associated With The Wireless Communication Device

904

Receive, From The Network Entity, An Identifier Of A Particular Subframe Of A Plurality Of Subframes And A Subframe Channel Map Of The Particular Subframe, Wherein The Wireless Communication Device Is Allocated To The Particular Subframe Based On A Comparison Of The One Or More Channels Included In The First Channel Map Information And One Or More Channels Included In The Subframe Channel Map Information Of The Particular Subframe

906

Transmit, To The Network Entity, A Periodic Advertisement (PA) Response Using A Channel Included In The Subframe Channel Map Of The Particular Subframe

FIG. 9

CHANNEL MAP ALLOCATION TO SUBFRAMES IN PERIODIC ADVERTISEMENT WITH RESPONSE

FIELD OF THE DISCLOSURE

The present disclosure generally relates to wireless communications. For example, aspects of the present disclosure relate to channel map allocation in a synchronization system including one or more network entities (e.g., central devices, such as access points (APs)) and one or more wireless communication devices (e.g., peripheral devices, such as electronic shelf labels (ESLs)).

BACKGROUND OF THE DISCLOSURE

Short range wireless communication enables wireless communication over relatively short distances (e.g., within thirty meters). For example, BLUETOOTH® is a wireless technology standard for exchanging data over short distances using short-wavelength ultra-high frequency (UHF) radio waves from 2.4 gigahertz (GHz) to 2.485 GHz.

BLUETOOTH® Low Energy (BLE) is a form of BLUETOOTH® communication that allows for communication with devices running on low power. Such devices may include beacons, which are wireless communication devices that may use low-energy communication technology for positioning, proximity marketing, or other purposes. In some cases, such devices may serve as nodes (e.g., relay nodes) of a wireless mesh network that communicates and/or relays information to a managing platform or hub associated with the wireless mesh network.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one illustrative example, a method for wireless communications of a network entity is provided. The method includes: receiving, from a first wireless communication device, first channel map information of the first wireless communication device, wherein the first channel map information includes one or more channels associated with the first wireless communication device; allocating the first wireless communication device to a particular subframe of a plurality of subframes based on comparing the one or more channels included in the first channel map information to one or more channels included in a subframe channel map of the particular subframe; transmitting, to the first wireless communication device, an identifier of the particular subframe and the subframe channel map; and receiving, from the first wireless communication device, a periodic advertisement (PA) response using a channel included in the subframe channel map of the particular subframe.

In another illustrative example, an apparatus of a network entity for wireless communications is provided. The apparatus includes at least one memory and at least one processor coupled to the at least one memory and configured to: receive, from a first wireless communication device, first channel map information of the first wireless communication device, wherein the first channel map information includes one or more channels associated with the first wireless communication device; allocate the first wireless communication device to a particular subframe of a plurality of subframes based on comparing the one or more channels included in the first channel map information to one or more channels included in a subframe channel map of the particular subframe; transmit, to the first wireless communication device, an identifier of the particular subframe and the subframe channel map; and receive, from the first wireless communication device, a periodic advertisement (PA) response using a channel included in the subframe channel map of the particular subframe.

In another illustrative example, a non-transitory computer-readable storage medium comprising instructions stored thereon which, when executed by at least one processor, causes the at least one processor to: receive, from a first wireless communication device, first channel map information of the first wireless communication device, wherein the first channel map information includes one or more channels associated with the first wireless communication device; allocate the first wireless communication device to a particular subframe of a plurality of subframes based on comparing the one or more channels included in the first channel map information to one or more channels included in a subframe channel map of the particular subframe; transmit, to the first wireless communication device, an identifier of the particular subframe and the subframe channel map; and receive, from the first wireless communication device, a periodic advertisement (PA) response using a channel included in the subframe channel map of the particular subframe.

In another illustrative example, an apparatus is provided for wireless communications. The apparatus includes: means for receiving, from a first wireless communication device, first channel map information of the first wireless communication device, wherein the first channel map information includes one or more channels associated with the first wireless communication device; means for allocating the first wireless communication device to a particular subframe of a plurality of subframes based on comparing the one or more channels included in the first channel map information to one or more channels included in a subframe channel map of the particular subframe; means for transmitting, to the first wireless communication device, an identifier of the particular subframe and the subframe channel map; and means for receiving, from the first wireless communication device, a periodic advertisement (PA) response using a channel included in the subframe channel map of the particular subframe.

In another illustrative example, a method for wireless communications of a wireless communication device is provided. The method includes: transmitting, to a network entity, first channel map information of the wireless communication device, wherein the first channel map information includes one or more channels associated with the wireless communication device; receiving, from the network entity, an identifier of a particular subframe of a plurality of subframes and a subframe channel map of the particular subframe, wherein the wireless communication device is allocated to the particular subframe based on a comparison of the one or more channels included in the first channel map information and one or more channels included in the subframe channel map of the particular subframe; and transmitting, to the network entity, a periodic advertisement (PA) response using a channel included in the subframe channel map of the particular subframe.

In another illustrative example, an apparatus of a wireless communication device for wireless communications is provided. The apparatus includes at least one memory and at least one processor coupled to the at least one memory and configured to: transmit, to a network entity, first channel map information of the wireless communication device, wherein the first channel map information includes one or more channels associated with the wireless communication device; receive, from the network entity, an identifier of a particular subframe of a plurality of subframes and a subframe channel map of the particular subframe, wherein the wireless communication device is allocated to the particular subframe based on a comparison of the one or more channels included in the first channel map information and one or more channels included in the subframe channel map of the particular subframe; and transmit, to the network entity, a periodic advertisement (PA) response using a channel included in the subframe channel map of the particular subframe.

In another illustrative example, a non-transitory computer-readable storage medium comprising instructions stored thereon which, when executed by at least one processor, causes the at least one processor to: transmit, to a network entity, first channel map information of the wireless communication device, wherein the first channel map information includes one or more channels associated with the wireless communication device; receive, from the network entity, an identifier of a particular subframe of a plurality of subframes and a subframe channel map of the particular subframe, wherein the wireless communication device is allocated to the particular subframe based on a comparison of the one or more channels included in the first channel map information and one or more channels included in the subframe channel map of the particular subframe; and transmit, to the network entity, a periodic advertisement (PA) response using a channel included in the subframe channel map of the particular subframe.

In another illustrative example, an apparatus is provided for wireless communications. The apparatus includes: means for transmitting, to a network entity, first channel map information of the wireless communication device, wherein the first channel map information includes one or more channels associated with the wireless communication device; means for receiving, from the network entity, an identifier of a particular subframe of a plurality of subframes and a subframe channel map of the particular subframe, wherein the wireless communication device is allocated to the particular subframe based on a comparison of the one or more channels included in the first channel map information and one or more channels included in the subframe channel map of the particular subframe; and means for transmitting, to the network entity, a periodic advertisement (PA) response using a channel included in the subframe channel map of the particular subframe.

In another illustrative example, an apparatus of a wireless communication device for wireless communications is provided. The apparatus includes at least one memory and at least one processor coupled to the at least one memory and configured to:

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a flow chart illustrating an example of a process for wireless communications at a network entity, in accordance with some examples;

FIG. 9 is a flow chart illustrating an example of a process for wireless communications at a wireless communication device, in accordance with some examples.

DETAILED DESCRIPTION

Figure 1:
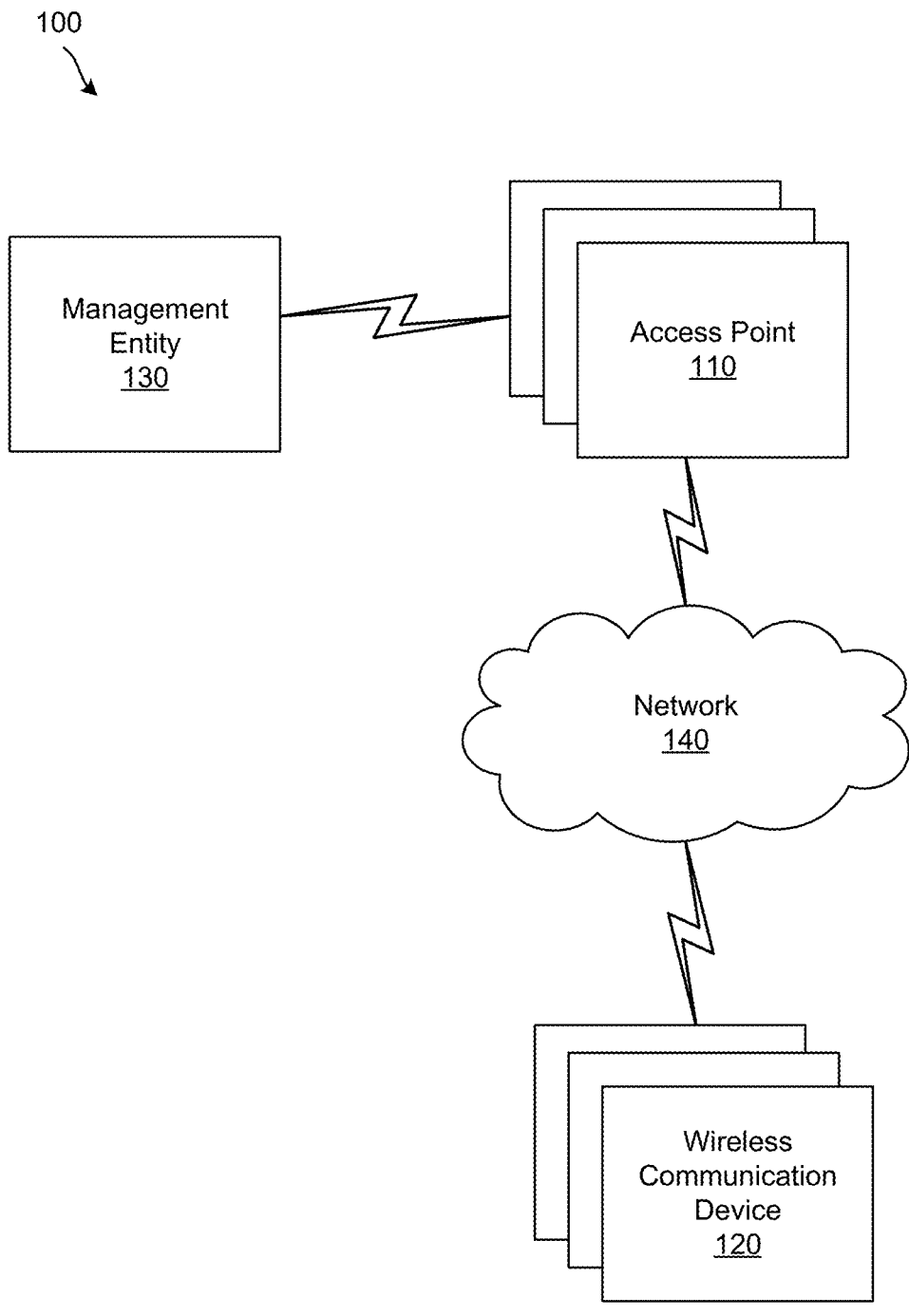
FIG. 1 is a diagram illustrating an example environment in which systems and/or methods described herein may be implemented, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

A system may include one or more wireless communication devices that are controlled by a network entity. For example, a system including multiple peripheral devices (e.g., an electronic shelf label (ESL) system) may include one or more wireless communication devices (e.g., peripheral devices, such as ESLs) that are controlled by a network entity, such as a management entity (ME), via at least one additional network entity, such as an access point (AP). As used herein, the terms "network entity" and "network" device may be interchangeable. For example, an AP can be referred to as an example of a "network entity" and/or can be referred to as an example of a "network device." A "network entity" can include an AP, an ME, and/or a combination of the two. A "network device" can include an AP, an ME, and/or a combination of the two. In some examples, a single device can implement the functionality of an ME and an AP (e.g., an ME and an AP can be combined in a single device). In one or more examples, to facilitate control by the ME, each peripheral device (e.g., ESL) may have a wireless connection (e.g., a BLUETOOTH® Low Energy (BLE) connection or other connection) to AP that is communicatively connected to the ME (e.g., via the Internet, such as wirelessly, via an Ethernet connection, etc.). In some cases, commands from the ME may be wirelessly transmitted to the peripheral devices (e.g., ESLs) by the AP. Responses or information from the peripheral devices may also be received by the AP and provided by the AP to the ME. Each AP may have an associated channel map. A channel map is a listing of frequency channels to be utilized or, conversely, not to be utilized (e.g., in the context of modification of frequency hopping sequences) by an AP for communication, such as with the ESLs or other peripheral devices. While examples are described herein using ESLs as illustrative examples of wireless communication devices, a management entity as an example of a network entity, and access points as examples of network entities, the systems and techniques described herein are applicable to any type of system or network.

In some examples, ESL systems can be deployed to support and manage ESL devices in stores (e.g., supermarkets) and other retail spaces. In some examples, ESL systems may be deployed to support and manage ESL devices in warehouses (e.g., distribution centers) and other industrial spaces. For instance, in a store, ESLs may be provided as electronic labels that are affixed to store shelves to identify the items and the price of the items located on the store shelf above the label. ESLs may be each implemented with a display (e.g., a liquid crystal display (LCD), an electronic paper (e-paper) display, etc.). The ESL may digitally display the name of the item, a product identification number for the item, such as a stock keeping unit (SKU) number, and a price for the item. The ESL may additionally display a barcode for the item, a quick response (QR) code for the item, and/or an image (e.g., a picture) of the item. In some examples, each ESL may include a display and a radio or wireless transceiver for communicating with one or more APs and/or MEs included in the ESL system. For example, during operation of the ESL system, the information displayed on the ESLs may be updated periodically by using periodic advertisements (PAS), as will be described in greater depth below.

As noted previously, in some examples, ESL systems can additionally, or alternatively, be used to support and manage ESL devices in warehouses (e.g., distributions) and other industrial spaces. For example, in a warehouse or distribution center, ESL devices can be provided as trackers that are attached to pallets or various other shipping containers that are moved throughout the warehouse and/or transported in a supply chain. In some examples, a tracker can be provided as a printed active (e.g., battery-powered) Bluetooth® Low Energy (BLE) label. A BLE tracker can be implemented based on (e.g., can be compliant with) the ESL protocol. For example, a BLE tracker can be attached to a pallet of merchandise and used to track the pallet of merchandise as it moves from a global distribution center (GDC) to a retail store environment.

In ESL systems, periodic advertisements (PAs) can be utilized to provide regular and predictable payload transmissions from a network device (e.g., such as an AP, also referred to as a "network entity") to one or more wireless communication devices (e.g., such as ESLs). For example, PAs can be used to issue information from a network device (e.g., network entity) to multiple wireless communication devices, which may be within one or more groups of wireless communication devices. PAs are generally unidirectional (e.g., unidirectional transmissions) such that PAs are transmitted only one-way from a network device (e.g., AP) to one or more wireless communication devices (e.g., ESLs). In some examples, the information displayed on the ESLs may be updated periodically by using periodic advertisements (PAS), as noted previously above.

Periodic Advertisement with Response (PAwR) (also referred to as periodic advertisement with multiple responses (PAwMR)) can be used for ESL systems to provide bidirectionality (e.g., bidirectional transmissions between a central device and one or more peripheral devices). Wireless communication devices (e.g., peripheral devices, such as ESLs) synchronized within a group of wireless communication devices can be addressed by a network device (e.g., AP, also referred to as a "network entity")) on a synchronized channel (e.g., a radio frequency (RF) channel between the network device and the wireless communication devices) whenever the network device chooses to send (e.g., transmit on a synchronized subevent) a request to the wireless communication devices. In some cases, as used herein, a synchronized channel refers to a channel on which transmissions are synchronized (in time). For example, the channel can utilize or can be based on a frequency on which one or more communications are transmitted. A hopping frequency sequence can be associated with the channel, where the hopping frequency sequence progresses at a fixed and/or pre-determined interval. A central device (e.g., AP, ME, etc.) and one or more peripheral devices (e.g., ESLs) can concurrently track the hopping frequency sequence at the predefined frequency hopping pattern (e.g., such that the central device knows when to transmit the request and the peripheral devices know when to listen for and/or receive the request).

In some cases, a request transmitted by a central device to peripheral devices in a particular group may be a PA containing a synchronization message transmitted by the central device on the synchronized channel to the peripheral devices of the particular group. For example, an AUX_SYNC_SUBEVENT_IND message can contain an AP Sync command. For example, wireless communication devices (e.g., ESLs) within the particular group can wake up (e.g., from a low power (LP) mode) at the same PA transmission with respect to a particular PAwR train for that group. For instance, ESLs within a particular group can wake up at the same particular sub-frame of a plurality of sub-frames (e.g., a PA frame may include 128 sub-frames, with a sub-interval of 12.5 ms). A PA transmission can include a periodic set of transmissions, which may be collectively referred to as a PA train, or a PAwR train when applied to PAwR. Each transmission of a PA train (or PAwR train) occurs at a precise point in time, with fixed intervals between the transmissions. A communication channel (e.g., one communication channel out of thirty-seven available communication channels) is selected for each of the transmissions, where the communication channel follows a hopping frequency sequence.

The synchronization between the central device and the peripheral devices in the group can be based on the periodicity of the PA. The periodically-transmitted messages (e.g., the synchronization messages) can include zero, one, or more commands (e.g., a respective operational code (OpCode) and parameters associated with each command). For example, the synchronization messages can include an AUX_SYNC_IND message associated with a PA train and/ or can include an AUX_SYNC_SUBEVENT_IND message associated with PAwR for APs/ESLs. If a response from a wireless communication device is expected by the network device (e.g., the synchronization message from the network device requests a response from a specific wireless communication device), the particular wireless communication device can respond in a specific response slot, which may be based on where the wireless communication device appeared within a sequence contained within the synchronization message transmitted by the network device.

As noted above, PAwR can be used to synchronize peripheral devices with a central device. Based on the synchronizing, the peripheral devices can respond to periodic transmissions (e.g., PAs) transmitted by the PAwR central (e.g., the central device). For example, a first set of time slots can be used to transmit the PAs from the central device (or the first set of time slots may be reserved for PA transmission from the central device). A second set of time slots can include time slots that are non-overlapping with (e.g., between) the first set of time slots associated with the PA transmission(s) from the central device. The second set of time slots can be used by the peripheral devices to transmit various responses to messages transmitted by the central device (e.g., responses to the PA transmission(s) from the central device).

Subframe allocation can be performed to join or subscribe a peripheral device to a central device. For example, subframe allocation can be performed during an onboarding procedure between the peripheral device and the central device, in response to a subscription request from the peripheral device to the central device, etc. Subframe allocation can be used to assign the peripheral device to a particular group of devices that communicate with the central device using the same subframe. For instance, a time frame associated with the central device may have a periodicity (e.g., duration) of 1.6 seconds and can be divided into a plurality of subframes (e.g., such as 128 subframes each having a periodicity of 12.5 milliseconds (ms)). A first group of devices can be allocated to a first subframe and may each communicate with the central device (e.g., transmit and/or receive messages) during the first subframe; a second group of devices can be allocated to a second subframe and may each communicate with the central device during the second subframe; etc. In addition to allocating a subframe, the central device may allocate a device ID to each peripheral device. Continuing in the example above, the central device may allocate a peripheral device to one of 128 different groups (e.g., corresponding to the 128 subframes), and may allocate the peripheral device to one of 256 device IDs associated with each group.

In some cases, the central device may perform subframe and device ID allocation based on an allocation sequence basis. The allocation sequence basis may be a fixed or pre-determined allocation sequence. For example, as new peripheral devices are onboarded to the central device, the plurality of different groups (e.g., subframes) and device IDs (e.g., slots within a respective subframe) can be allocated sequentially to the peripheral devices, based on the allocation sequence basis. Sequential subframe and device ID allocation can result in peripheral devices being allocated into subframe groups based on the relative timing of each peripheral device's onboarding or subscription to the central (e.g., the first 256 peripheral devices may be allocated the 256 device IDs of subframe group 1, the next 256 peripheral devices may be allocated the 256 device IDs of subframe group 2, etc.).

The various peripheral devices for which subframe and device ID allocation is performed may be associated with different distances and communication paths to the central device. For example, some of the peripheral devices may be located relatively close to the central device and may be able to communicate (e.g., transmit and receive on the PAwR train of the central device) with a relatively low transmit power (e.g., a relatively low configured transmit power and a relatively low measured transmitted power). Other ones of the peripheral devices may be located relatively far from the central device and may require a relatively higher transmit power to communicate on the PAwR train of the central device. Additionally, one or more peripheral devices may not have a clear line-of-sight communication path to the central device and may also require a relatively higher transmit power to communicate on the PAwR train of the central device.

In some cases, one or more ESLs may be physically moved to a new location. For example, one or more ESLs may be moved from one location in a retail store (e.g., a particular shelf or a storage area) to a different location in the retail store, to a different retail store location, etc. In some examples, store shelves (e.g., with a plurality of ESLs attached thereto) may be attached to a gondola that allows the moving or repositioning the shelves and the products provided on the shelves. In another example, an ESL that is provided as a tracker (e.g., such as a printed active BLE label) may by physically moved during transportation of a pallet (e.g., to which the tracker is attached) from a distribution center to a retail store location. Changing the location of the ESL may result in the ESL losing synchronization with (e.g., due to being out of range) a current access point for which the ESL is associated. Such a loss in synchronization may interrupt the management entity's ability to control the ESL and the ESL's ability to report to the management entity. After determining a network outage (e.g., caused by the loss of synchronization), the ESL may perform an onboarding procedure to reestablish synchronization with an access point. To perform the onboarding procedure, the ESL may transmit advertisement messages, receive a connection request from an in-range access point that detected the advertisement messages, and exchange messages with the access point (e.g., including the exchange of periodic advertisement synchronization transfer (PAST) information). The onboarding procedure may consume significant computing resources (e.g., processor resources, memory resources, and/or battery resources, among other examples) of the ESL and/or the access point, and frequent advertisement by one or more ESLs may result in spectral pollution on advertisement channels of the wireless network.

Currently, access point synchronization can enable discovery and synchronization of communication timings of multiple access points within an ESL system. In particular, periodic advertisement timings used by the multiple access points may be synchronized. In access point synchronization, an ESL can have access to multiple access points. When an ESL is moved from one location to another location such that the ESL is out of range of its current associated access point, the ESL can identify an alternative access point that is within range of the ESL to associate with and jump on a PA train (e.g., a PAwR train, a PAwMR train, or other PA train) associated with that access point. However, in a typical environment (e.g., a large retail store, a warehouse, etc.), access points may be positioned in various different locations around the environment. As noted above, an access point is associated with a channel map that includes one or more RF channels that the access point can use for communicating with other devices, such as ESLs. The different access points positioned in the different locations around the environment may each have a different channel map because, for example, different areas of the environment (e.g., different departments of the store) may utilize different radio frequency (RF) frequency channels. The channel map of an access point can also be updated via a channel map update (CMU).

An ESL that has access to multiple access points may have access to a hopping frequency sequence (HFS) of each of the access points and/or may be able to derive the HFS of each access point from information stored by the ESL (e.g., information communicated to the ESL during on-boarding of the ESL with an access point). For example, the multiple access points may use different respective HFSs (e.g., offset from one another) to avoid interference among the multiple access points. A HFS can be generated through a pseudo-random sequence based on a number of parameters (e.g., four parameters). For instance, the pseudo-random sequence can generate a random number in the range [0 . . . 36] (including all channels). A further set can then be imposed, such as by filtering out one or more channels that are outside of the channel map of an access point, and then substituting the filtered-out channels with one or more channels included in the channel map. Therefore, knowing the HFS (e.g., provided in the PAST information during on-boarding of an ESL) may need to be supplemented with the channel map. However, the HFS of an access point may not take into account a channel map of that access point or other access points, for example because the application of the channel map may be a post-HFS computation, which cannot be expressed a priori (e.g., due to the channel map evolving over time). An ESL may thus not be able to maintain knowledge of HFSs of access points when a channel map update occurs for each access point.

In an access point synchronization system implementing PAwR (as well as in PAwR without an access point synchronization system), a central device (e.g., AP or other network entity) can use a channel map indicative of channel classification and/or other channel information determined by the central device. The channel map used by and/or associated with a central device may be referred to as a "central channel map." The central device can transmit information indicative of the central channel map to a plurality of peripherals (e.g., peripherals associated with or subscribed to the central device) using sync_info. The central device can also transmit information indicative of an update or change to the central channel map to the plurality of peripherals using a channel map update (CMU).

In PAwR, a central device can utilize the central channel map information during the transmission of AP Sync commands from the central device to the plurality of peripheral devices. For instance, during AP Sync sending, the central device can select a channel to use for transmitting the AP Sync command by selecting from the central channel map using Channel Selection Algorithm #2 (CSA #2) and/or various other channel selection algorithms. For instance, various channel selection algorithms can be utilized based on the channel map of the central, wherein channel selection is based on the combination of a particular one of the various channel selection algorithms and the channel map of the central. In some cases, CSA #2 can be called by the central device every time before transmitting an AP Sync command to select a channel for the transmission from the central channel map. CSA #2 can be called by the central device with parameters that may include one or more of event-Counter, accessAddr, quantity of channels, and ChannelMap (e.g., the central channel map). Based on the central channel map being provided to the peripherals associated with the central device, and based on the additional parameters provided to CSA #2 during the call by the central device, the peripheral devices may implement CSA #2 locally using the same parameters as the central device, to determine the channel for an upcoming AP Sync command from the central device.

In a congested environment, peripheral devices may be more likely to have carrying channel classifications. For instance, a plurality of peripherals associated with the same central device may have different channel classifications across the various peripherals included in the plurality. The channel classification information can be indicative of a perceived quality of each channel of a plurality of channels that can be used by a peripheral device. For instance, channel classification information may classify a plurality of channels as good or bad (e.g., for a 1-bit channel classifi- cation utilizing either a '0' value or a '1' value to classify each channel) based on how much noise the peripheral device sees on each respective channel of the plurality of channels. In some examples, a peripheral device can deter- mine channel classification information indicative of a chan- nel quality or amount of noise seen by the peripheral device on each of channels 0-40. For instance, the channels used for PAwR sync signals are channels 0-40 (except for legacy channels 37, 38, 39).

Different peripherals subscribed to the same central device can determine different channel classification infor- mation, for example based on differences in physical loca- tion relative to the central device, differences in obstructed or non-obstructed line of sight to the central device, and various other differences in the RF signal environment between the respective peripheral and the central device. Currently, there is no way in a PAwR-based system for a peripheral device to inform a central device of channel classification information determined by the peripheral and/ or of channel classification information otherwise associated with the peripheral. Without knowledge of the channel classification information at a particular peripheral device, the central device is unable to adjust the central-peripheral communications with the particular peripheral device based on the corresponding channel classification information for the particular device, and instead utilizes only the central channel map information to perform channel selection and/ or allocation for central-peripheral communications. There is a need for systems and techniques that can be used to implement subframe-specific (e.g., group of peripherals) channel maps. There is a further need for systems and techniques that can be used to implement subframe-specific (e.g., group of peripherals) channel maps based on respec- tive channel classification information associated with some (or all) of a plurality of peripheral devices associated with a central device.

Systems, apparatuses, processes (also referred to as meth- ods), and computer-readable media (collectively referred to as "systems and techniques") are described herein that can be used to perform channel map allocation based on channel classification information associated with peripheral devices. In one illustrative example, the systems and tech- niques can be used to perform adaptive channel map allo- cation for Periodic Advertisement with Response (PAwR) subframes. For instance, adaptive channel map allocation for PAwR subframes can be performed by a central device associated with a plurality of peripheral devices, based on channel classification information associated with some (or all) of the plurality of peripheral devices.

In some aspects, the central device can determine or calculate a channel map corresponding to each subframe of a plurality of subframes. For instance, the central device can determine a channel map to use for each subframe of a PAwR frame (e.g., 128 subframes with a duration of 12.5 ms, included in a 1.6 s frame). In one illustrative example, the central device can determine a channel map for each sub- frame based on receiving channel classification information and/or channel map information from peripheral devices that are subscribed to or associated with the central device. In some cases, a peripheral device can share the channel map corresponding to the peripheral device (e.g., also referred to as a "peripheral channel map") with the central device during an onboarding process performed to subscribe the peripheral device to the central device. In some examples, a peripheral device can share the peripheral channel map with the central device using a Sync message transmitted from the peripheral device to the central device in a peripheral- initiated response slot (e.g., a peripheral-initiated PAwR response slot).

In some aspects, the central device can transmit one or more periodic advertisements (PAs) using a respective chan- nel determined for each subframe of the plurality of PAwR subframes. For instance, a subframe-specific channel map can be determined for each subframe based on the corre- sponding peripheral channel map information of some (or all) of the peripheral devices that are allocated to the subframe.

In some examples, the central device can use Channel Selection Algorithm #2 (CSA #2) to determine a respective channel for a subframe, based on calling CSA #2 with the sub-frame specific channel map corresponding to the sub- frame. In one illustrative example, the central device can call CSA #2 using the corresponding subframe-specific channel map and may determine a particular channel (e.g., selected from the corresponding subframe-specific channel map using CSA #2) to use for transmitting to the group of peripheral devices corresponding to the subframe (e.g., Tx by the central device). The central device may additionally call CSA #2 using the corresponding subframe-specific channel map to determine a particular channel of the sub- frame-specific channel map to scan for transmissions from the group of peripheral devices corresponding to the sub- frame (e.g., Rx by the central device).

In some aspects, the central device may determine and perform a subframe-specific channel map update (CMU) process. For instance, the subframe CMU process can be performed to maintain the continuity of the synchronization between the central device and the plurality of peripheral devices associated with (e.g., subscribed to) the central device). In some cases, a peripheral device may initiate a peripheral-initiated subframe CMU request. Based on the peripheral-initiated subframe CMU request, the central device may perform a subframe-specific CMU to update the channel map corresponding to the peripheral's current sub- frame. In another example, based on the peripheral-imitated subframe CMU request, the central device can perform subframe reallocation to reallocate the peripheral device to a different subframe having a different channel map that better matches with updated channel classification informa- tion for the peripheral device.

Additional aspects of the present disclosure are described with reference to the figures.

FIG. 1 is a diagram of an example environment 100 in which systems and/or methods described herein may be implemented. As shown in FIG. 1, the environment 100 may include at least one access point (AP) 110, at least one wireless communication device 120, a management entity (ME) 130, and a network 140. Devices of the environment 100 may interconnect via wired connections, wireless connections, or a combination of wired and wireless connections.

The access point 110 may include one or more devices capable receiving, generating, storing, processing, providing, and/or routing information associated with access point synchronization and/or handover, as described elsewhere herein. The access point 110 may include a communication device and/or a computing device. The access point 110 may be configured to transmit beacons (e.g., BLE beacons), as well as to scan and locate other devices (e.g., other devices communicating using BLE protocols).

The wireless communication device 120 may include one or more devices capable of receiving, generating, storing, processing, and/or providing information associated with access point synchronization and/or handover, as described elsewhere herein. The wireless communication device 120 may include a communication device and/or a computing device. In some aspects, the wireless communication device 120 may be, may include, or may be included in an electronic shelf label (ESL).

The management entity 130 includes one or more devices capable of receiving, generating, storing, processing, providing, and/or routing information associated with access point synchronization and/or handover, as described elsewhere herein. The management entity 130 may include a communication device and/or a computing device. For example, the management entity 130 may include a server, such as an application server, a client server, a web server, a database server, a host server, a proxy server, a virtual server (e.g., executing on computing hardware), or a server in a cloud computing system. In some aspects, the management entity 130 includes computing hardware used in a cloud computing environment. The management entity 130 may provide control of a system (e.g., an ESL system) that includes the access point(s) 110, the wireless communication device(s) 120, and/or the device(s) 130. The access point(s) 110 may be communicatively connected to the management entity 130 via a network (not shown), such as the Internet.

The network 140 may include one or more wireless networks. For example, the network 140 may include a personal area network (e.g., a Bluetooth network). The network 140 enables communication among the devices of environment 100.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
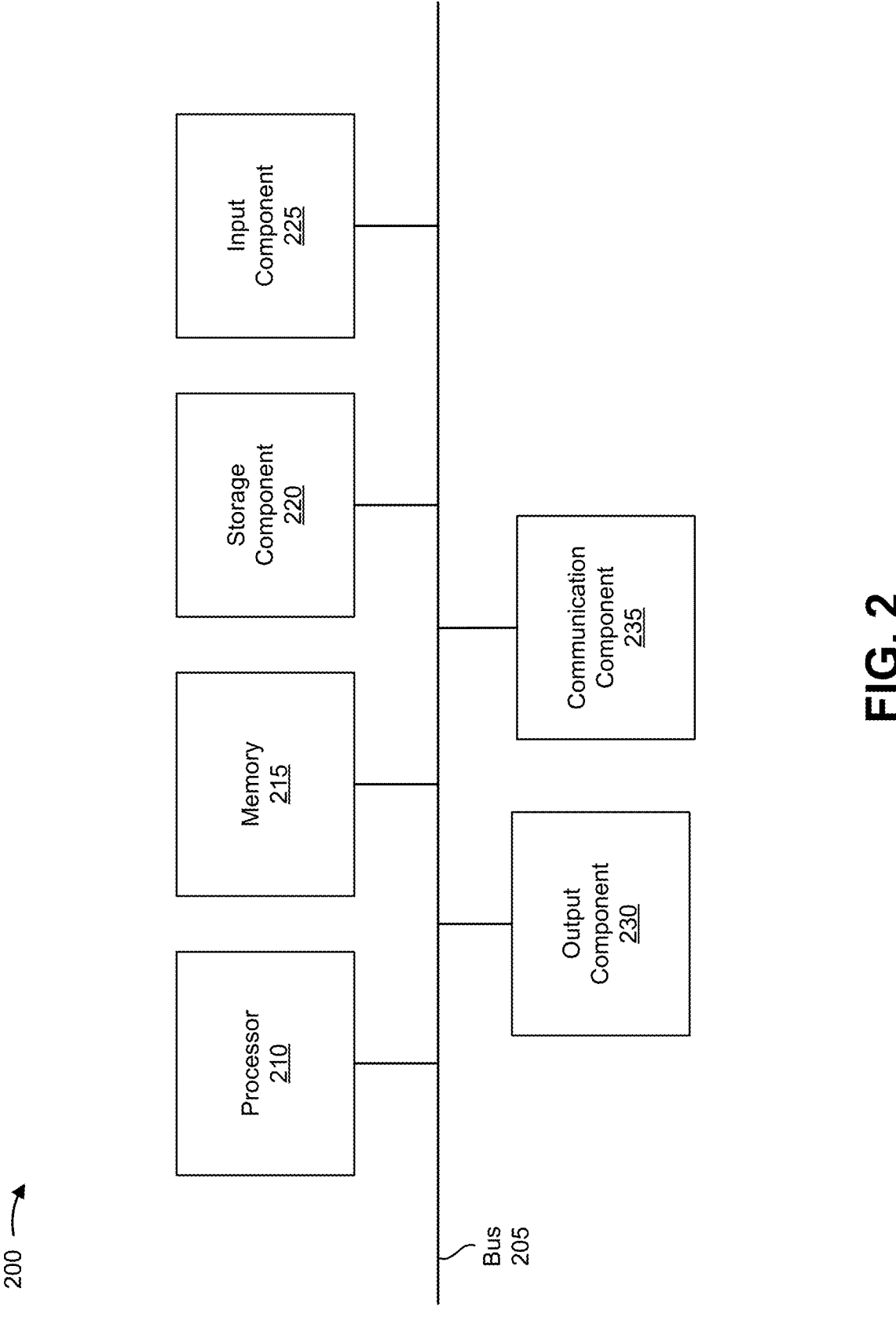
FIG. 2 is a diagram illustrating example components of a device, in accordance with some examples.

FIG. 2 is a diagram illustrating example components of a device 200, in accordance with the present disclosure. Device 200 may correspond to access point 110, wireless communication device 120, and/or management entity 130. In some aspects, access point 110, wireless communication device 120, and/or management entity 130 may include one or more devices 200 and/or one or more components of device 200. As shown in FIG. 2, device 200 may include a bus 205, a processor 210, a memory 215, a storage component 220, an input component 225, an output component 230, and/or a communication component 235.

Bus 205 may include a component that permits communication among the components of device 200. Processor 210 may be implemented in hardware, firmware, or a combination of hardware and software. Processor 210 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 may include one or more processors capable of being programmed to perform a function. Memory 215 may include a random access memory (RAM), a read only memory (ROM), and/or another type of dynamic or static storage device (e.g., a flash memory, a magnetic memory, and/or an optical memory) that stores information and/or instructions for use by processor 210.

Storage component 220 can store information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 may include a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 can include a component that provides output information from device 200 (e.g., a display, a speaker, a haptic feedback component, and/or an audio or visual indicator).

Communication component 235 may include one or more transceiver-like components (e.g., a transceiver and/or a separate receiver and transmitter) that enables device 200 to communicate with other devices, such as via a wired connection, a wireless connection, or a combination of wired and wireless connections. Communication component 235 may permit device 200 to receive information from another device and/or provide information to another device. For example, communication component 235 may include an Ethernet interface, an optical interface, a coaxial interface, an infrared interface, a radio frequency interface, a universal serial bus (USB) interface, a wireless local area interface (e.g., a Wi-Fi interface or a BLE interface), and/or a cellular network interface.

Communication component 235 may include one or more antennas for receiving wireless radio frequency (RF) signals transmitted from one or more other devices, cloud networks, and/or the like. The antenna may be a single antenna or an antenna array (e.g., antenna phased array) that can facilitate simultaneous transmit and receive functionality. The antenna may be an omnidirectional antenna such that signals can be received from and transmitted in all directions. The wireless signals may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network.

The one or more transceiver-like components (e.g., a wireless transceiver) of the communication component 235 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals into a baseband or intermediate frequency and can convert the RF signals to the digital domain.

In some cases, a CODEC may be implemented (e.g., by the processor 210) to encode and/or decode data transmitted and/or received using the one or more wireless transceivers. In some cases, encryption-decryption may be implemented (e.g., by the processor 210) to encrypt and/or decrypt data (e.g., according to the Advanced Encryption Standard (AES) and/or Data Encryption Standard (DES) standard) transmitted and/or received by the one or more wireless transceivers.

In some aspects, device 200 may represent an ESL. The ESL may include a battery in addition to the aforementioned components. In some aspects, the output component 230 of the ESL may be an electronic paper (e-paper) display or a liquid crystal display (LCD).

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication component 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
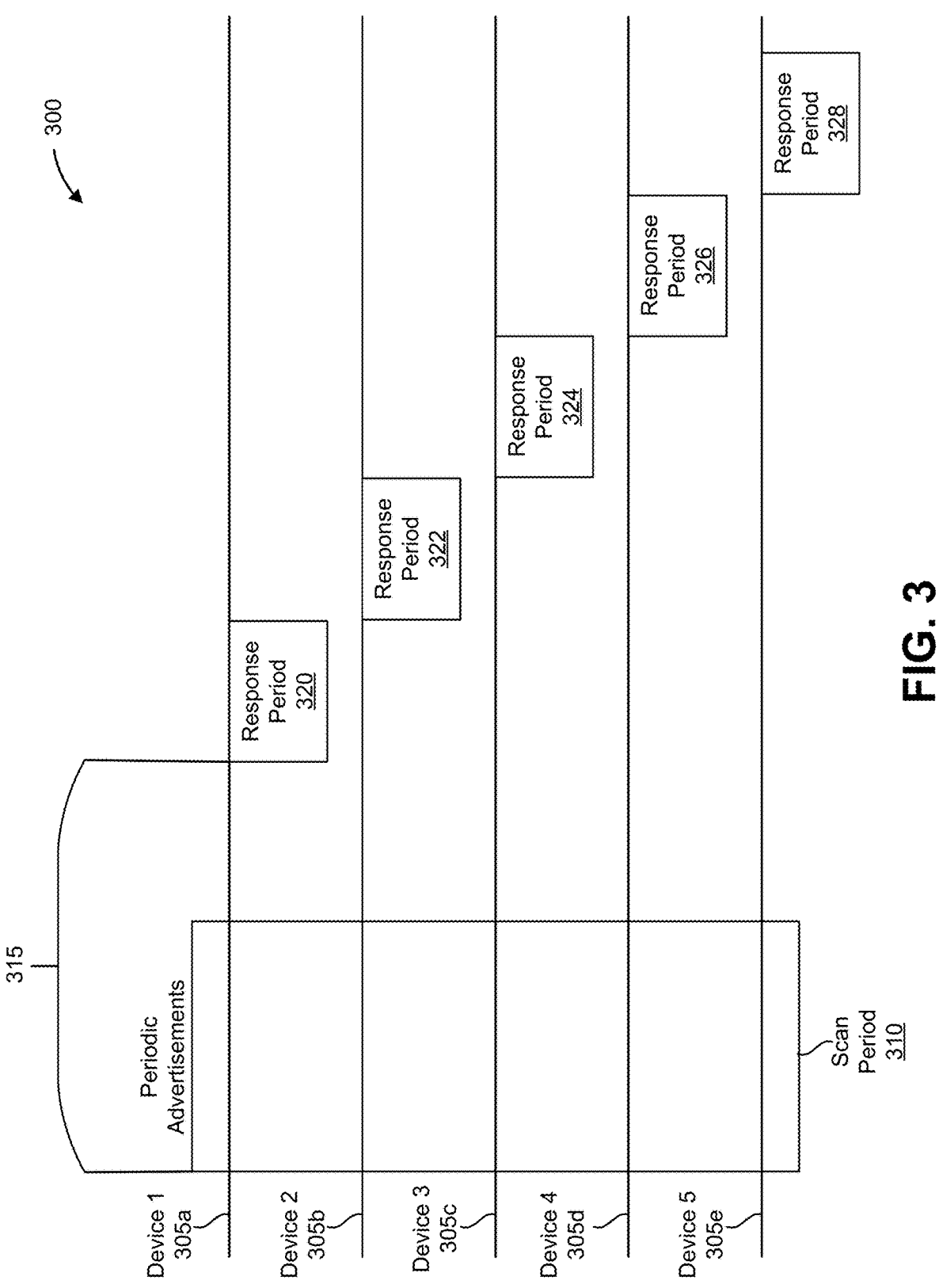
FIG. 3 is a signaling diagram illustrating an example of communication transmissions, in accordance with some examples.
Figure 4:
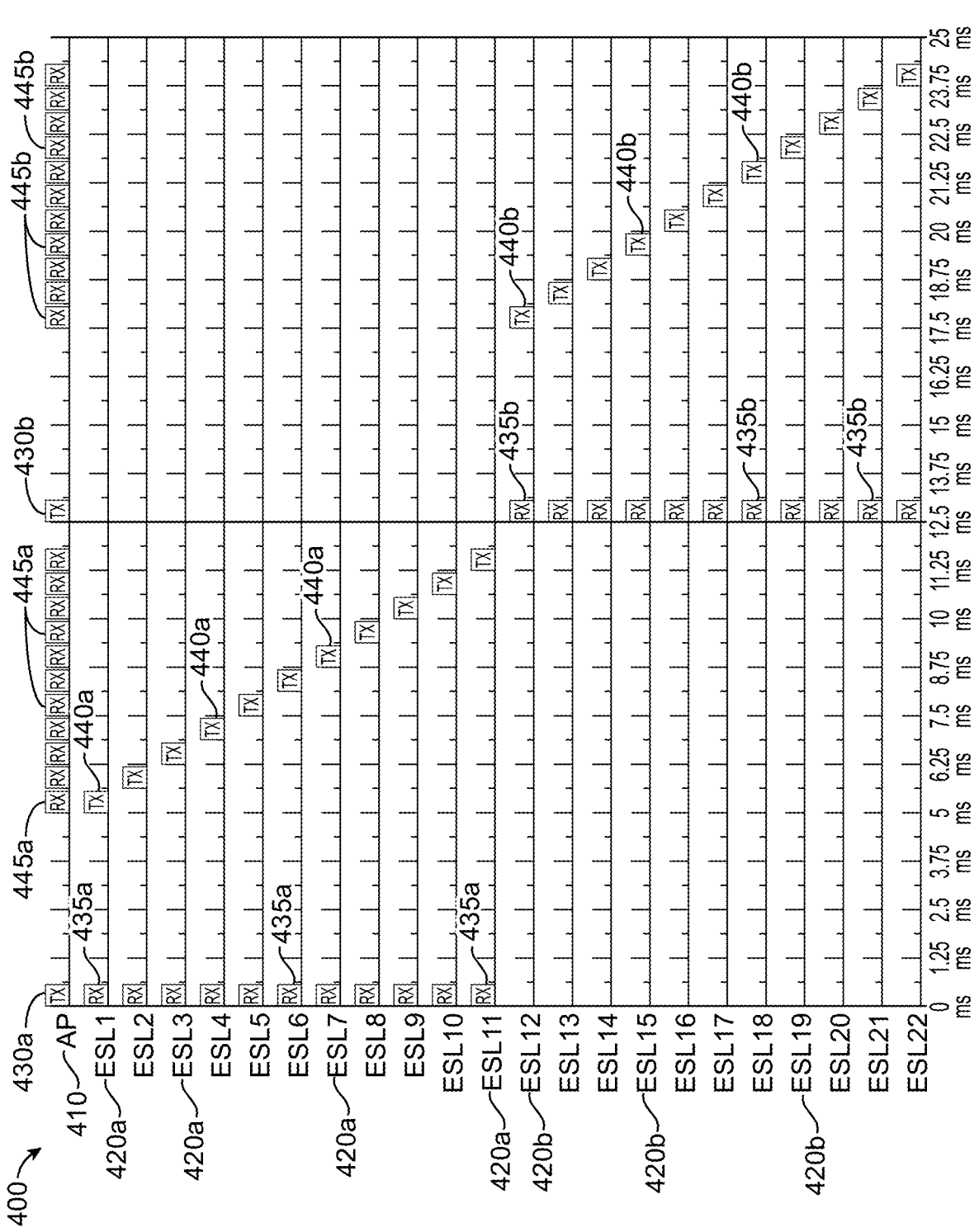
FIG. 4 is a signaling diagram illustrating an example of communication transmissions between a network device and two groups of wireless communication devices, in accordance with some examples.

FIGS. 3 and 4 show signaling diagrams illustrating examples of PAwR in an ESL system. For example, the signaling diagram of FIG. 3 illustrates an example PAwR for a group of wireless network devices (e.g., device 1 305a, device 2 305b, device 3 305c, device 4 305d, and device 5 305e), and the signaling diagram of FIG. 4 illustrates an example PAwR for two groups of wireless network devices 420a, 420b (e.g., a first group including ESL1 to ESL 11, and a second group including ESL 12 to ESL 22). Specifically, FIG. 3 is a signal timing diagram illustrating a portion of a communication between an access point (e.g., access point 110) and wireless communication devices 120 (e.g., ESLs). With reference to FIG. 1, the signal sequence illustrated in FIG. 3 may be implemented by one or more of the communication connections, access points 110, and/or wireless communication devices 120 of FIG. 1.

The devices (e.g., device 1 305a, device 2 305b, device 3 305c, device 4 305d, and device 5 305c) of FIG. 3 may be selected from wireless communication devices 120 of FIG. 1 and may each receive a periodic advertisement (PA) in a scan period 310. The scan period 310 may occur in regularly scheduled intervals and may be repeated periodically such that the devices (e.g., device 1 305a, device 2 305b, device 3 305c, device 4 305d, and device 5 305c) can awaken to scan for messages during this repeated scan period 310. An access point (e.g., access point 110 of FIG. 1) may provide periodic advertisements (PAS) via broadcast or multi-cast to the devices (e.g., device 1 305a, device 2 305b, device 3 305c, device 4 305d, and device 5 305e) in the scan period 310. For an access point (e.g., access point 110 of FIG. 1), the scan period 310 can be its primary transmission period. In some cases, the scan period 310 may not be a fixed time because the access point (e.g., access point 110 of FIG. 1) may send different lengths of data from the start of the scan period 310.

The transmission may include multiple advertisements in a train. One or more portions of the advertisements may be directed to one or more of the devices (e.g., device 1 305a, device 2 305b, device 3 305c, device 4 305d, and device 5 305e). The devices (e.g., device 1 305a, device 2 305b, device 3 305c, device 4 305d, and device 5 305c) may decode or filter the messages intended for each specific device and transmitted during the period when all devices are receiving. In this way, the devices (e.g., device 1 305a, device 2 305b, device 3 305c, device 4 305d, and device 5 305e) may be reprogrammed, updated, and/or sent requests from an access point (e.g., access point 110 of FIG. 1) or relayed from another device (e.g., management entity 130 of FIG. 1) through the access point (e.g., access point 110 of FIG. 1). The periodic advertisement (PA) from the access point (e.g., access point 110 of FIG. 1) may set a response period for one or more of the devices (e.g., device 1 305a, device 2 305b, device 3 305c, device 4 305d, and device 5 305c).

As illustrated, the devices (e.g., device 1 305a, device 2 305b, device 3 305c, device 4 305d, and device 5 305e) are each assigned a response period 320, 322, 324, 326, 328 in the time after the scan period 310. In some cases, the assignment of the response period to a particular device may not be permanent. In some aspects, the assignment may be inferred from a payload of a synchronization message. The first response period 320 may begin following an idle time 315 after the scan period 310, with the idle period being long enough to provide the transmitter device an opportunity to do other Bluetooth related activities. The assigned response periods may also be limited to or designate a particular frequency of the channels on which to respond. For example, in FIG. 3, device 1 305a is assigned response period 320, device 2 305b is assigned response period 322, device 3 305c is assigned response period 324, device 4 305d is assigned response period 326, and device 5 305e is assigned response period 328. The access point (e.g., access point 110 of FIG. 1) may store attributes of the devices (e.g., device 1 305a, device 2 305b, device 3 305c, device 4 305d, and device 5 305c), including whether a device is able to transmit or respond. The PA signaling followed by responses can be referred to as Periodic Advertisement with Response (PAwR) (or as periodic advertisement with multiple responses (PAwMR)).

For example, device 3 305c (e.g., wireless communication device 120 of FIG. 1) may be an ESL and may receive a price update in a PA from the access point (e.g., access point 110 of FIG. 1) in scan period 310. The PA received at device 3 305c may include a designated start time for the response period 324 or may include a schedule of response start times for devices including device 3 305c. The response by device 3 305c to the access point (e.g., access point 110 of FIG. 1) may include an acknowledgement, a status code, and/or other information such as battery life, received signal strength, and/or an error notification. The response by device 3 305c may include information to be relayed to another device by the access point (e.g., access point 110 of FIG. 1). The response may include a packet with a header and may conform to any of the Bluetooth protocols. A response may be transmitted in a data channel of the Bluetooth protocol to the access point (e.g., access point 110 of FIG. 1). Both the PA and the responses from all of the devices (e.g., device 1 305a, device 2 305b, device 3 305c, device 4 305d, and device 5 305e) may use channels of the Bluetooth protocol.

A device (e.g., device 5 305e) that has been assigned a response period may not respond and may determine that it has nothing to signal. For example, the devices (e.g., device 1 305a, device 2 305b, device 3 305c, device 4 305d, and device 5 305c) may determine what response, if any, is required and may or may not respond to a request sent from the access point (e.g., access point 110 of FIG. 1). The response periods 320, 322, 324, 326, 328 may be assigned based on a request for such a period in an open transmission time, the request being sent to the access point (e.g., access point 110 of FIG. 1). The response periods 320, 322, 324, 326, 328 may be assigned based on which devices have been requested by the access point (e.g., access point 110 of FIG. 1) to send data or acknowledgements. The PA messages and responses may be frequency-hopped, time synchronized channels, and/or extended channels of the advertising channels in Bluetooth.

As previously mentioned, FIG. 4 shows an example PAwR for two groups of wireless network devices 420a, 420b (e.g., a first group including ESL1 to ESL 11, and a second group including ESL 12 to ESL 22). In particular, FIG. 4 is a signaling diagram illustrating an example of communication transmissions 400 between a network device 410 (e.g., a central device, which may be an access point) and two groups of wireless communication devices 420a, 420b (e.g., peripheral devices, which may be ESLs). With reference to FIG. 1, the signal sequence illustrated in FIG. 4 may be implemented by one or more of the communication connections, access points 110, and/or wireless communication devices 120 of FIG. 1.

In FIG. 4, the signaling diagram is shown in the form of a graph with an x-axis denoting time in milliseconds (ms) and a y-axis denoting specific wireless communication devices 420a, 420b (e.g., ESL1, ESL 2, ESL 3, ESL 4, ESL 5, ESL 6, ESL 7, ESL 8, ESL 9. ESL 10, ESL 11, ESL 12, ESL 13, ESL 14, ESL 15, ESL 16, ESL 17, ESL 18, ESL 19, ESL 20, ESL 21, and ESL 22). In particular, the x-axis of the graph of FIG. 4 denotes time starting from 0 ms and ending at 25 ms. The time can be divided into two subframes, which are each a length of 12.5 ms. As such, the two subframes may include a first subframe from 0 ms to 12.5 ms, and a second subframe from 12.5 ms to 25 ms. In one or more examples, there may be more or less than two subframes as is shown in FIG. 4, and/or each subframe may be longer or shorter than 12.5 ms as shown in FIG. 4.

In one or more examples, the wireless communication devices 420a, 420b (e.g., peripheral devices) may be assigned (e.g., by the network device 410 and/or by a network entity, such as a management entity) to different groups (e.g., two groups) of wireless communication devices 420a, 420b. For example, wireless communication devices 420a (e.g., ESL1, ESL 2, ESL 3, ESL 4, ESL 5, ESL 6, ESL 7, ESL 8, ESL 9, ESL 10, and ESL 11) may be assigned to a first group (e.g., group 1), and wireless communication devices 420b (e.g., ESL 12, ESL 13, ESL 14, ESL 15, ESL 16, ESL 17, ESL 18, ESL 19, ESL 20, ESL 21, and ESL 22) may be assigned to second group (e.g., group 2).

In FIG. 4, during operation for PAwR, at time 0 ms for the first subframe of time, the network device 410 (e.g., a central, such as an AP) may transmit 430a to a first group (e.g., group 1) of wireless communication devices 420a (e.g., ESL 1, ESL 2, ESL 3, ESL 4, ESL 5, ESL 6, ESL 7, ESL 8, ESL 9, ESL 10, and ESL 11) a PA containing a synchronization message (e.g., an AP synchronization message) over a synchronized channel between the network device 410 and the wireless communication devices 420a, 420b. As noted previously, a synchronization message can include one or more commands. For instance, a command can include an operational code (OpCode) and parameters associated with the command. At time 0 ms, the first group of wireless communication devices 420a (e.g., ESL 1, ESL 2, ESL 3, ESL 4, ESL 5, ESL 6, ESL 7, ESL 8, ESL 9, ESL 10, and ESL 11) can receive 435a the PA containing the synchronization message over the synchronized channel.

In one or more examples, the network device 410 may be configured to transmit PAs at a specified time interval (e.g., a subframe of time), such as at every 12.5 ms as is shown in FIG. 4. In one or more examples, the specified time interval (e.g., a subframe) may be shorter or longer than the 12.5 ms as is shown in FIG. 4. The wireless communication devices 420a, 420b may respond to a PA by using their specific respective response slot in time.

In one or more examples, the synchronization message transmitted 430a to the first group (e.g., group 1) of wireless communication devices 420a (e.g., ESL 1, ESL 2, ESL 3, ESL 4, ESL 5, ESL 6, ESL 7, ESL 8, ESL 9, ESL 10, and ESL 11) may indicate a respective response slot for one or more of the wireless communication devices 420a (e.g., ESL 1, ESL 2, ESL 3, ESL 4, ESL 5, ESL 6, ESL 7, ESL 8, ESL 9, ESL 10, and/or ESL 11) in the first group to use to transmit 440a a response to the network device 410. If a wireless communication device 420a (e.g., ESL 1, ESL 2, ESL 3, ESL 4, ESL 5, ESL 6. ESL 7, ESL 8, ESL 9, ESL 10, and ESL 11) is addressed within the synchronization message, the wireless communication device 420a (e.g., ESL 1, ESL 2, ESL 3, ESL 4, ESL 5, ESL 6. ESL 7, ESL 8, ESL 9, ESL 10, and ESL 11) can respond (e.g., transmit 440a) in its respective response slot, as indicated within the synchronization message.

For instance, the synchronization message may indicate a specific sequence for one or more of the wireless communication devices 420a (e.g., ESL 1, ESL 2, ESL 3, ESL 4, ESL 5, ESL 6, ESL 7, ESL 8, ESL 9, ESL 10, and/or ESL 11) to respond (e.g., transmit 440a) in time (e.g., responding after 5 ms has elapsed after the start of the subframe at response slots located every 0.625 ms). For example, the sequence may indicate that wireless communication device 420a (e.g., ESL 1) should respond in a response slot located at 5 ms, wireless communication device 420a (e.g., ESL 2)

should respond in a response slot located at 5.625 ms, wireless communication device 420*a* (e.g., ESL 3) should respond in a response slot located at 6.25 ms, wireless communication device 420*a* (e.g., ESL 4) should respond in a response slot located at 6.875 ms, wireless communication device 420*a* (e.g., ESL 5) should respond in a response slot located at 7.5 ms, wireless communication device 420*a* (e.g., ESL 6) should respond in a response slot located at 8.125 ms, wireless communication device 420*a* (e.g., ESL 7) should respond in a response slot located at 8.75 ms, wireless communication device 420*a* (e.g., ESL 8) should respond in a response slot located at 9.375 ms, wireless communication device 420*a* (e.g., ESL 9) should respond in a response slot located at 10 ms, wireless communication device 420*a* (e.g., ESL 10) should respond in a response slot located at 10.625 ms, and wireless communication device 420*a* (e.g., ESL 11) should respond in a response slot located at 11.25 ms.

After the wireless communication devices 420*a* (e.g., ESL 1, ESL 2, ESL 3, ESL 4, ESL 5, ESL 6, ESL 7, ESL 8, ESL 9, ESL 10, and ESL 11) have received 435*a* the PA containing the synchronization message from the network device 410, according to the sequence specified within the synchronization message, the one or more wireless communication devices 420*a* (e.g., ESL 1, ESL 2, ESL 3, ESL 4, ESL 5, ESL 6, ESL 7, ESL 8, ESL 9, ESL 10, and/or ESL 11) can transmit 440*a* their responses within their respective response slots. After the one or more wireless communication devices 420*a* (e.g., ESL 1, ESL 2, ESL 3, ESL 4, ESL 5, ESL 6, ESL 7, ESL 8, ESL 9, ESL 10, and/or ESL 11) have transmitted 440*a* their responses in their respective time slots, the network device 410 can receive 445*a* their transmitted responses at those specific response slot times.

Then, during operation for PAwR, at time 12.5 ms for the second subframe of time, the network device 410 may transmit 430*b* to a second group (e.g., group 2) of wireless communication devices 420*b* (e.g., ESL 12, ESL 13, ESL 14, ESL 15, ESL 16, ESL 17, ESL 18, ESL 19, ESL 20, ESL 21, and ESL 22) a PA containing a synchronization message over a synchronized channel between the network device 410 and the wireless communication devices 420*a*, 420*b*. In addition, at time 12.5 ms, the second group of wireless communication devices 420*b* (e.g., ESL 12, ESL 13, ESL 14, ESL 15, ESL 16, ESL 17, ESL 18, ESL 19, ESL 20, ESL 21, and ESL 22) can receive 435*b* the PA containing the synchronization message over the synchronized channel.

The synchronization message transmitted 430*b* to the second group (e.g., group 2) of wireless communication devices 420*b* (e.g., ESL 12, ESL 13, ESL 14, ESL 15, ESL 16, ESL 17, ESL 18, ESL 19, ESL 20, ESL 21, and ESL 22) may indicate a respective response slot for one or more of the wireless communication devices 420*b* (e.g., ESL 12, ESL 13, ESL 14, ESL 15, ESL 16, ESL 17, ESL 18, ESL 19, ESL 20, ESL 21, and/or ESL 22) in the second group to use to transmit 440*b* a response to the network device 410. If a wireless communication device 420*b* (e.g., ESL 12, ESL 13, ESL 14, ESL 15, ESL 16, ESL 17, ESL 18, ESL 19, ESL 20, ESL 21, and ESL 22) is addressed within the synchronization message, the wireless communication device 420*b* (e.g., ESL 12, ESL 13, ESL 14, ESL 15, ESL 16, ESL 17, ESL 18, ESL 19, ESL 20, ESL 21, and ESL 22) can respond (e.g., transmit 440*b*) in its respective response slot, as indicated within the synchronization message.

For example, the synchronization message may indicate a specific sequence for one or more of the wireless communication devices 420*b* (e.g., ESL 12, ESL 13, ESL 14, ESL 15, ESL 16, ESL 17, ESL 18, ESL 19, ESL 20, ESL 21, and/or ESL 22) to respond (e.g., transmit 440*b*) in time (e.g., responding after 5 ms has elapsed after the start of the subframe at response slots located every 0.625 ms). For example, the sequence may indicate that wireless communication device 420*b* (e.g., ESL 12) should respond in a response slot located at 17.5 ms, wireless communication device 420*b* (e.g., ESL 13) should respond in a response slot located at 18.125 ms, wireless communication device 420*b* (e.g., ESL 14) should respond in a response slot located at 18.75 ms, wireless communication device 420*b* (e.g., ESL 15) should respond in a response slot located at 19.375 ms, wireless communication device 420*b* (e.g., ESL 16) should respond in a response slot located at 20 ms, wireless communication device 420*b* (e.g., ESL 17) should respond in a response slot located at 20.625 ms, wireless communication device 420*b* (e.g., ESL 18) should respond in a response slot located at 21.25 ms, wireless communication device 420*b* (e.g., ESL 19) should respond in a response slot located at 21.875 ms, wireless communication device 420*b* (e.g., ESL 20) should respond in a response slot located at 22.5 ms, wireless communication device 420*b* (e.g., ESL 21) should respond in a response slot located at 23.125 ms, and wireless communication device 420*b* (e.g., ESL 22) should respond in a response slot located at 23.75 ms.

After the wireless communication devices 420*b* (e.g., ESL 12, ESL 13, ESL 14, ESL 15, ESL 16, ESL 17, ESL 18, ESL 19, ESL 20, ESL 21, and ESL 22) have received 435*b* the PA containing the synchronization message from the network device 410, according to the sequence specified within the synchronization message, the one or more wireless communication devices 420*b* (e.g., ESL 12, ESL 13, ESL 14, ESL 15, ESL 16, ESL 17, ESL 18, ESL 19, ESL 20, ESL 21, and/or ESL 22) may transmit 440*b* their responses within their respective response slots. After the one or more wireless communication devices 420*b* (e.g., ESL 12, ESL 13, ESL 14, ESL 15, ESL 16, ESL 17, ESL 18, ESL 19, ESL 20, ESL 21, and/or ESL 22) have transmitted 440*b* their responses in their respective time slots, the network device 410 can receive 445*b* their transmitted responses at those specific response slot times. Then, the PAwR may continue similarly for subsequent subframes of time.

PAwR can be used to synchronize peripheral devices (e.g., wireless communication device 420*a*, 420*b*, a peripheral device such as an ERL, etc.) with a network device (e.g., network device 410, a central device such as an access point, etc.), but may perform subframe allocation independent of one or more transmit power determinations. For example, subframe allocation may be performed independent of one or more transmit power determinations (e.g., such as minimum transmit power requirements or determinations) from a central device to a peripheral device, and vice versa. In some cases, PAwR transmissions from a central device to a peripheral device may utilize a constant transmit power across all subframes and/or across all peripheral devices. PAwR transmissions from various peripheral devices to a central device may additionally utilize a constant transmit power.

As noted above, there is a need for systems and techniques that can be used to perform channel map allocation based on channel classification information associated with peripheral devices. Described herein are systems and techniques that can be used to perform channel map allocation based on channel classification information associated with peripheral devices. In one illustrative example, the systems and techniques can be used to perform adaptive channel map allocation for Periodic Advertisement with Response (PAwR) subframes. For instance, adaptive channel map allocation for PAwR subframes can be performed by a central device associated with a plurality of peripheral devices, based on channel classification information associated with some (or all) of the plurality of peripheral devices.

In one illustrative example, subframe specific channel maps can be managed by a central device (e.g., a central device such as an AP included in a PAwR synchronization system). For example, subframe specific channel maps can be determined, stored, managed, applied, etc., by a central device for each subframe of a plurality of subframes included in a frame (e.g., PAwR frame, with a duration of 1.6 s). In some cases, the term "subframe-specific channel map" can be used interchangeably with the term "subframe channel map". A subframe channel map may also be referred to interchangeably as a "group channel map" or "group-specific channel map." For example, a central device can transmit periodic advertisements (PAs) during a plurality of subframes of a frame (e.g., within one of the 128 subframes each having a duration of 12.5 ms that are included in a 1.6 s PAwR frame). Each subframe can be associated with a set of peripheral devices that may transmit and/or receive during a particular subframe. A channel map that is applied for a particular subframe is also applied for the particular set (e.g., group) of peripheral devices that may transmit and/or receive during the particular subframe (e.g., a subframe channel map is also a group channel map, for the corresponding group of peripheral devices of the subframe).

In some aspects, a peripheral device can be associated with a central device and may be allocated (e.g., by the central device) a particular subframe channel map (e.g., group channel map) that corresponds to channel classification information associated with one or more of the central device, the peripheral device, and/or other peripheral devices within the same group. For instance, based on channel classification information associated with a particular peripheral device (e.g., where the channel classification information is indicative of the channels perceived as poor by the peripheral device and the channels perceived as good by the peripheral device), the central device may determine a best fit subframe (e.g., a best-fit subframe channel map corresponding to the subframe) to allocate the particular peripheral device. As will be described in greater depth below, in some aspects, the subframe allocation for peripheral devices can be performed based on an intersection of channels perceived as good by the central device, by the particular peripheral device, the respective subframe channel maps already associated with subframes, and/or network configuration parameters (e.g., such as a sync loss threshold).

Figure 5:
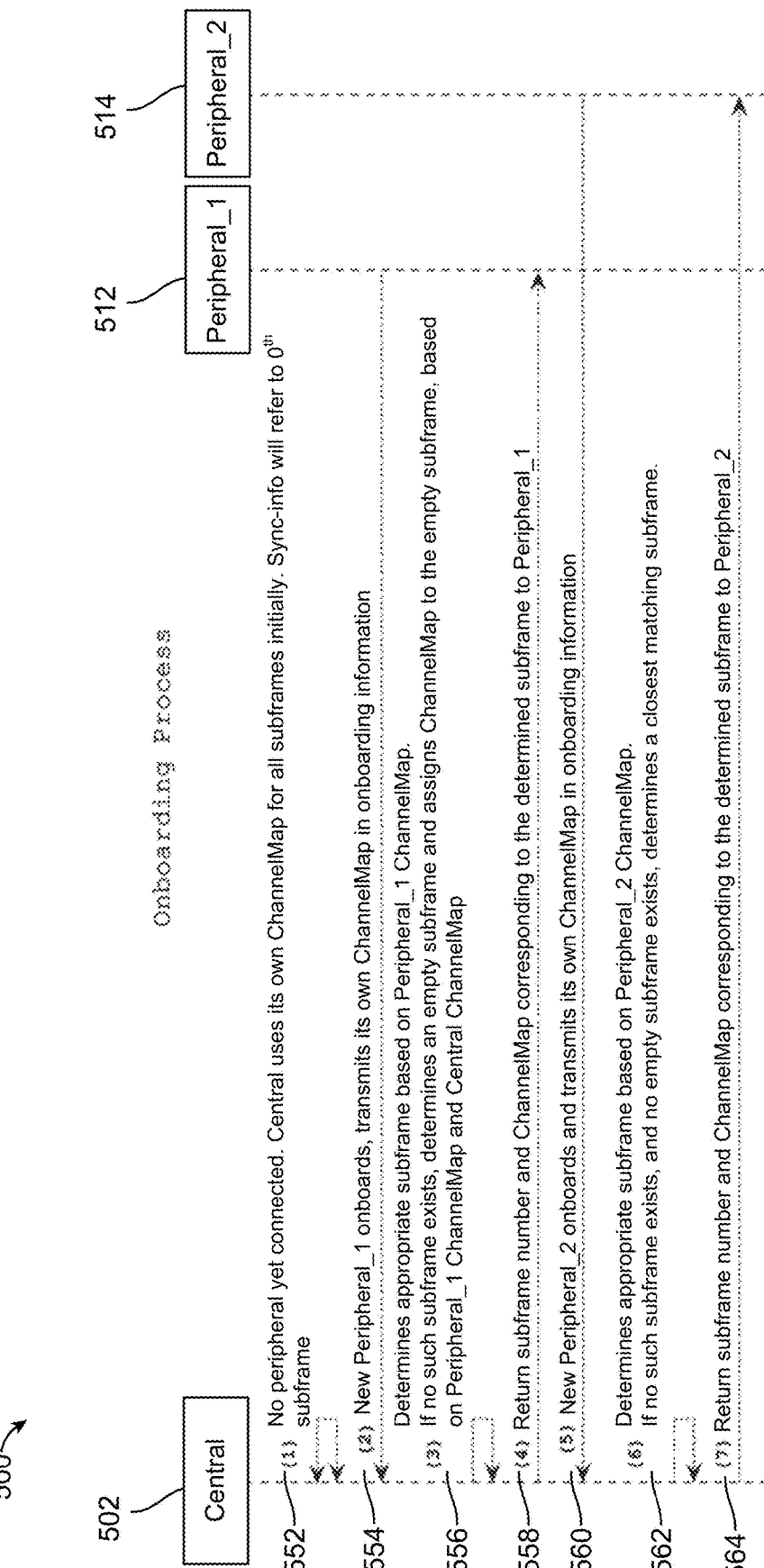
FIG. 5 is a signaling diagram illustrating an example of an onboarding process of peripheral devices to a central device using subframe channel maps, in accordance with some examples.

FIG. 5 is a signaling diagram illustrating an example of an onboarding process 500 of peripheral devices to a central device using subframe channel maps (e.g., group channel maps). The onboarding process 500 can be performed between a central device 502 and a one or more peripheral devices (e.g., such as the first peripheral device 512 and the second peripheral device 514). As used herein, the term "channel classification" may be used to refer to a single entity's assessment of one or more wireless communication channels (e.g., assessment of Bluetooth channels by a peripheral device or ESL, a central device or AP, etc.). As used herein, the term "channel map" may be used to refer to a set of channels (e.g., of a plurality of channels) selected by a central device (e.g., AP) for use in a PAwR train of the central device. In some cases, the terms "channel map" and "channel classification" may be used interchangeably.

The central device 502 can be associated with a central channel map, indicative of one or more RF channels that the central device 502 may use for communicating with other devices, such as the peripheral devices 512, 514. RF channels included in a channel map (e.g., such as the central channel map) can be determined based on interference or other channel quality information determined for a plurality of channels. Channels having relatively low interference, relatively good channel quality information, etc., may be more suitable for use in communicating with other devices, and may be included in the channel map. Channels having relatively high interference, relatively poor channel quality information, etc., may be less suitable and/or unsuitable for use in communicating with other devices, and may be outside of the channel map (e.g., are not included in the channel map).

In addition to a central channel map associated with the central device 502, each peripheral device may be associated with a corresponding channel map (e.g., a corresponding channel classification information) indicative of one or more RF channels suitable for use by the peripheral device. For instance, a peripheral device can determine a corresponding channel map (e.g. its peripheral channel map) based on the corresponding channel classification information determined by the peripheral device. In one illustrative example, the peripheral device can generate a corresponding channel map that includes an indication of a first subset of channels (e.g., of a plurality of channels) classified as "good" (e.g., suitable for use by the peripheral device) and/or an indication of a second subset of channels (e.g., of the plurality of channels) classified as "bad" (e.g., not suitable for use by the peripheral device). In some aspects, the peripheral device can classify each channel of the plurality of channels (e.g., Bluetooth channels) as "good" or "bad" based on a type of channel assessment implemented by the peripheral device. For instance, the per-channel classification information may be indicated using a binary bit per channel, with a first value of the binary bit corresponding to a "good" channel indication and a second value of the binary bit corresponding to a "bad" channel indication, etc. In another example, the peripheral device can classify each channel of the plurality of channels using a value within a numerical range corresponding to a rating scale (e.g., per-channel classification information may be indicated using a value between 1-5, 1-10, etc.). The corresponding channel map for a peripheral device can also be referred to herein as a "peripheral channel map." A peripheral device can determine its peripheral channel map based on measuring channel quality information, in a manner the same as or similar to that in which the central device 502 determine the central channel map.

At block 552 of onboarding process 500, the peripheral devices 512 and 514 are not yet connected to central device 502. In some cases, no peripheral devices are connected to central device 502. The central device 502 may initially configure the plurality of subframes (e.g., of a frame, such as a PAwR frame) using the central channel map corresponding to central device 502. For instance, each of 128 12.5 ms subframes of a 1.6 s frame can be configured with the central channel map for central device 502. In some aspects, Sync-info transmitted by central device 502 may always refer to the $0^{th}$ subframe.

At block 554, first peripheral 512 (e.g., "Peripheral_1") begins onboarding with central device 502 as a new peripheral device. In some examples, the onboarding process performed by first peripheral 512 can be used to transmit a first peripheral channel map (e.g., a first peripheral channel classification information) from the first peripheral 512 to the central 502. The first peripheral channel map can include one or more channels that are suitable for use for communications with and/or by the first peripheral 512. In some cases, the first peripheral channel map can be included in an onboarding request or other onboarding information transmitted from first peripheral 512 to central 502.

At block 556, the central device 502 can determine an appropriate subframe for the first peripheral 512. For instance, central device 502 can determine a particular subframe to allocate to first peripheral 512. The particular subframe allocated to first peripheral 512 can be subsequently used for communications between the central device 502 and peripheral 512. In one illustrative example, central device 502 can determine the particular subframe for onboarding first peripheral 512 based on the Peripheral_1 channel map (e.g., the first peripheral channel map corresponding to first peripheral 512) that was transmitted from first peripheral 512 to central 502 at block 554 of onboarding process 500.

For instance, central device 502 can use the first peripheral channel map included in the onboarding information received at block 554 to compare the channels suitable for use by first peripheral 512 (e.g., the one or more channels included in the first peripheral map) with the channels available at the various subframes associated with a PAwR train between central device 502. For example, central device 502 can compare the channels included in the Peripheral_1 channel map information to the channels included in the Central channel map information associated with any of the existing subframes.

In some cases, central device 502 can identify a particular subframe to allocate to the first peripheral 512 based on a match between the channels included in the Peripheral_1 channel map and the channels included in the Central channel map. For instance, central device 502 can allocate first peripheral 512 to a subframe that has a subframe channel map that matches exactly with the Peripheral_1 channel map (e.g., the channels included in the subframe channel map are the same as the channels included in the subframe channel map). In some cases, central device 502 can allocate first peripheral 512 to a subframe having a subframe channel map that includes all of the channels that are included in the Peripheral_1 channel map. In some examples, central device 502 can allocate first peripheral 512 to a subframe having a subframe channel map that includes a greatest number or quantity of the channels that are included in the Peripheral_1 channel map. In another example, central device 502 can allocate first peripheral 512 to a subframe having a subframe channel map that includes a greatest percentage of the channels that are included in the Peripheral_1 channel map. In some cases, central device 502 can allocate first peripheral 512 to a subframe having a subframe channel map that includes a quantity or percentage of matching channels (e.g., channels also included in the Peripheral_1 channel map) above a threshold.

In some cases, at block 556, central device 502 may determine that an appropriate subframe (e.g., matching subframe channel map for Peripheral_1 channel map) does not currently exist. In one illustrative example, if central device 502 does not identify an existing subframe and subframe channel map that closely matches with Peripheral_1 channel map, central device 502 can subsequently determine if any empty subframes exist. An empty subframe can be a subframe that is not yet allocated to any peripheral devices. Based on identifying an empty subframe, central device 502 allocate first peripheral 512 to the identified empty subframe. In some cases, central device 502 can assign a channel map to the empty subframe that is the same as or similar to one or more (or both) of the Central channel map associated with central device 502 and/or the Peripheral_1 channel map associated with first peripheral device 512. In one illustrative example, the central device 502 can generate a channel map based on the intersection of the channels included in the Peripheral_1 channel map with the channels included in the Central channel map. For instance, central device 502 can generate a subframe channel map (e.g., for an empty subframe being allocated to first peripheral 512 at block 556) that includes one or more channels, where each channel of the one or more channels included in the subframe channel map is also included in both the Peripheral_1 channel map and the Central channel map. The generated subframe channel map can be associated with or to the empty subframe, at or by the central device 502.

At block 558, central device 502 can return the allocated subframe number or other identifier, and the subframe channel map corresponding to the allocated subframe, to the first peripheral 512. For instance, central device 502 can transmit a message to peripheral 512 indicative of a subframe number or identifier corresponding to the allocated subframe for peripheral 512 and further indicative of a corresponding subframe channel map for the allocated subframe.

At block 560, a second peripheral device 514 can perform onboarding with central device 502. In some cases, the second peripheral 514 can be the same as or similar to first peripheral 512. In some aspects, the onboarding process between central device 502 and second peripheral 514 can be the same as or similar to the onboarding process between central device 502 and first peripheral 512, described above with respect to block 554.

Second peripheral 514 can be associated with a second channel map (e.g., channel classification information or report) that is different from the one associated with first peripheral 512. For instance, the Peripheral_2 channel map can be different than the Peripheral_1 channel map (e.g., can include one or more channels that are different than or not included in the Peripheral_1 channel map) based on different RF conditions at second peripheral 514 than at first peripheral 512.

At block 562, the central device 502 determines an appropriate subframe for the second peripheral 514. The subframe determined for second peripheral 514 may be the same as the subframe determined for first peripheral 512 at block 556, or may be different from the subframe determined for first peripheral 512 at block 556. In some examples, determining an appropriate subframe for second peripheral 514 is based on determining a particular subframe to allocate to second peripheral 514, where the particular subframe allocated to second peripheral 514 has a subframe channel map that includes one or more channels that are also included in the Peripheral_2 channel map associated with second peripheral 514.

In one illustrative example, at block 562 central device 502 may determine that an appropriate subframe does not exist for second peripheral 514 and the Peripheral_2 channel map information obtained at block 560 of onboarding process 500. For instance, central device 502 may determine that no existing (e.g., previously allocated) subframes have a channel map that includes any of the channels included in the Peripheral_2 channel map, that no existing subframes have a channel map that includes a quantity or percentage of the channels included in the Peripheral_2 channel map that is above or below a pre-determined threshold, etc.

Based on determining that no subframe exists (e.g., is allocated) with a subframe channel map that matches the Peripheral_2 channel map, at block 562 central device 502 can determine whether any empty (e.g., not yet allocated) subframes exist. If an empty subframe exists, second peripheral 514 can be allocated to the empty subframe as described above with respect to first peripheral 512 at block 556.

If central device 502 determines that no empty (e.g., unallocated) subframes exist (e.g., all of the subframes have been allocated to at least one other peripheral device, and have a subframe channel map corresponding to the peripheral channel map of the other peripheral device), at block 562 central device 502 can determine a closest matching subframe. The closest matching subframe can be the particular subframe having a corresponding subframe channel map that includes some, but not all, of the channels that are included in the Peripheral_2 channel map associated with second peripheral 514. The closest matching subframe can have a subframe channel map that includes a quantity or percentage of channels that are also included in the Peripheral_2 channel map associated with second peripheral 514, where the quantity or percentage of channels is above a second threshold but below a first threshold (e.g., a threshold associated with determining an appropriate subframe that includes a greater quantity or percentage of channels also included in the peripheral channel map than the quantity or percentage included in the closest matching channel map).

In one illustrative example, central device 502 can perform subframe allocation for a peripheral device based on identifying the subframe having a corresponding subframe channel map with a maximum quantity or percentage of overlapping channels with the peripheral channel map of the peripheral device. In some cases, central device 502 can receive peripheral channel map information from a peripheral device that includes one or more channels appropriate for use by the peripheral device and includes information indicative of one or more channels that are not appropriate for use by the peripheral device. For example, when the peripheral channel map information received by the central device 502 is indicative of one or more channels that are not appropriate for use by the peripheral device, central device 502 can allocate a subframe to the peripheral that has a corresponding subframe channel map that includes a greatest number or quantity of overlapping channels with the peripheral channel map and that does not include any of the channels indicated as not appropriate for use by the peripheral device in the peripheral channel map information.

At block 564, the central device 502 returns the subframe number or other identifier and corresponding subframe channel map associated with the particular subframe identified at block 562 to the second peripheral 514. For instance, central device 502 can transmit to second peripheral 514 a message indicative of the subframe number or other identifier of the particular subframe identified at block 562 and further indicative of the corresponding subframe channel map for the particular subframe.

In one illustrative example, central device 502 can dynamically allocate and/or manage the plurality of subframes and/or the plurality of subframe channel maps corresponding to the plurality of subframes based on one or more requests received from peripheral devices associated with the central device 502. The peripheral requests can be received from peripherals that are not yet associated with (e.g., subscribed to or onboarded with) central device 502, as described above with respect to onboarding process 500 of FIG. 5. In another illustrative example, peripheral requests can be received by central device 502 from peripherals that are already associated with (e.g., subscribed to or onboarded with) central device 502. As will be described in greater depth below, the central device can dynamically allocate (e.g., reallocate) and manage the subframe channels maps based on a channel map update (CMU) process that can be performed when one or more (or both) of the Central channel map corresponding to the central device or the Peripheral channel map corresponding to a peripheral device changes.

Figure 6:
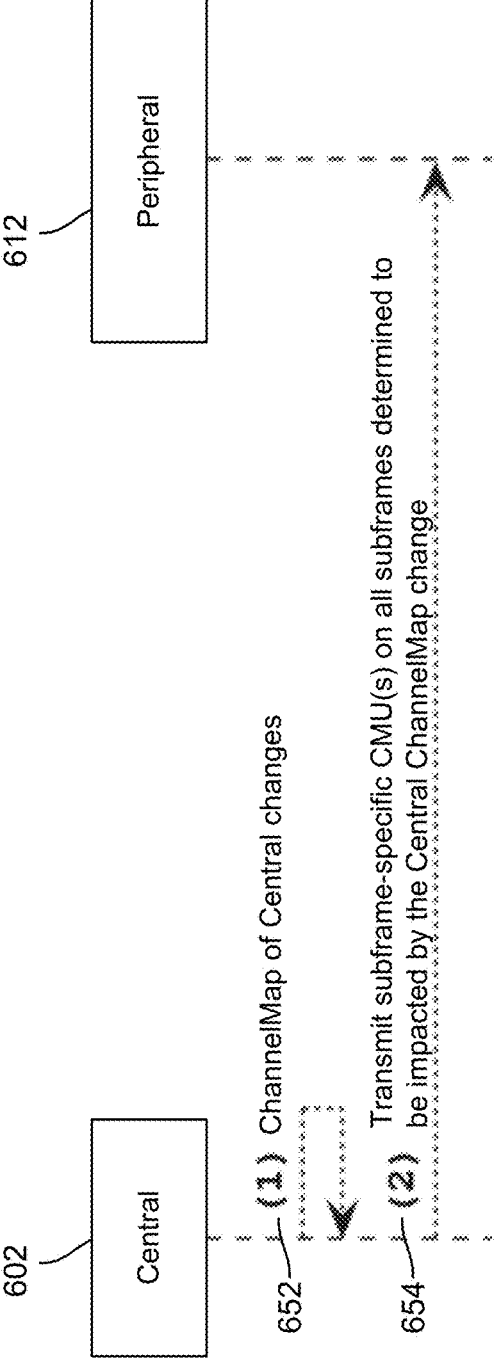
FIG. 6 is a signaling diagram illustrating an example of a channel map update process performed based on an updated channel map associated with a central device, in accordance with some examples.

FIG. 6 is a signaling diagram illustrating an example of a channel map update (CMU) process 600 that can be performed at a central device associated with one or more peripheral devices, in accordance with some examples. For instance, central device 602 can be the same as or similar to central device 502 of FIG. 5. In some cases, peripheral 612 can be the same as or similar to one or more (or both) of the first peripheral device 512 and/or the second peripheral 514 of FIG. 5. In some aspects, peripheral 612 may have previously performed the onboarding process 500 of FIG. 5 with central device 602 and been allocated to a particular subframe having a corresponding subframe channel map that best matches with the peripheral channel map of peripheral 612.

At block 652 of the CMU process 600, the channel map of the central device 602 changes (e.g., the Central channel map changes). For example, the Central channel map can change to include one or more channels that were previously outside of (e.g., not included in) the Central channel map prior to the update. The Central channel map can additionally change to exclude one or more channels that were previously included in the Central channel map prior to the update.

At block 654, central device 602 can determine one or more subframes of the plurality of subframes that are impacted by the update to the Central channel map that was determined at block 652. For instance, when the updated Central channel map includes one or more additional channels that were previously outside of the Central channel map, central device 602 can determine one or more subframes that are allocated to peripheral devices having respective subframe channel maps (e.g., channel maps for particular subframes, based on channel assessments from one or multiple peripheral devices) that include at least one of the one or more additional channels (e.g., subframes allocated to peripheral devices for which the newly added additional channels of the updated Central channel map are suitable for use). When the updated Central channel map no longer includes one or more channels that are updated to be outside of the updated Central channel map, central device 502 can determine one or more subframes of the plurality of subframes that have respective subframe channel maps that include the now excluded channels.

In one illustrative example, central device 602 can transmit one or more subframe-specific CMUs (e.g., also referred to as "subframe CMU(s)") on each subframe of one or more subframes that were identified as being impacted by the Central channel map change (e.g., the one or more subframes having subframe channel maps and/or allocated peripheral devices that are impacted by the channels added to or removed in the updated Central channel map). In some aspects, the subframe CMUs (e.g., subframe re-allocations) can be determined by central device 602 during the central CMU process 600 of FIG. 6 in a manner the same as or similar to that described above with respect to the subframe allocation performed by central device 502 during the onboarding process 500 of FIG. 5. For example, peripheral devices having a peripheral channel map that includes one or more channels that are newly included in the updated Central channel map may be reallocated to a subframe that includes at least one of the new channels of the updated Central channel map. In another example, peripheral devices having a peripheral channel map that includes one or more channels that are newly excluded from (e.g., outside of) the updated Central channel map may be reallocated to a subframe having a corresponding subframe channel map that is determined to be the next best match for the peripheral channel map.

The subframe CMUs can be used by central device 602 to maintain the continuity of the synchronization with the peripheral devices, such as peripheral 612, based on updating the allocation of peripheral devices to subframes. In some cases, the central device 602 can additionally update the mapping of subframe channel maps to subframes, based on one or more (or both) of a subframe CMU triggered by an update to the Central channel map and/or a subframe CMU triggered by an update to one or more peripheral channel maps.

In one illustrative example, a peripheral device can initiate a peripheral-initiated CMU request for the central device to update an allocation (e.g., reallocate) of the peripheral device to a subframe. For example, a peripheral device can initiate a peripheral-initiated subframe CMU request based on the peripheral channel map information changing (e.g., to include one or more channels previously outside of the peripheral channel map, to exclude one or more channels previously included in the peripheral channel map, or a combination of the two). Both the Central channel map update and the Peripheral channel map update may be based on changing RF conditions determined or measured at the central device or the peripheral device, respectively.

In some aspects, a peripheral-initiated CMU request received at the central device can cause the central device to perform a subframe-specific CMU. A subframe-specific CMU can be used by the central device to update the subframe channel map corresponding to the peripheral device's currently allocated subframe. The peripheral device's currently allocated subframe can be allocated to one or more additional peripherals that are included in the same group as the peripheral device. The subframe-specific CMU can update the subframe channel map used by each peripheral device that is allocated to the particular subframe corresponding to the subframe-specific CMU (e.g., each peripheral included in the group corresponding to the particular subframe). In some aspects, the central device can perform a subframe-specific CMU based on receiving a peripheral-initiated CMU request from some (or all) of the peripheral devices included in the group of peripheral devices allocated to a particular subframe. The central device can determine the subframe-specific CMU based on the updated peripheral channel map information received from each respective peripheral, the Central channel map (which may itself also be an updated Central channel map as described above with respect to FIG. 6), and/or a network configuration (e.g., such as a sync-loss threshold).

In another illustrative example, a peripheral-initiated CMU request received at the central device can cause the central device to perform a subframe reallocation for at least the peripheral corresponding to the peripheral-initiated CMU request. For instance, the central device can reallocate the peripheral to a new subframe having a subframe channel map that matches or most closely matches the updated peripheral channel map indicated in the peripheral-initiated CMU request. The reallocation may be performed in a manner the same as or similar to that described above with respect to the onboarding process 500 of FIG. 5. In some cases, the central device can reallocate multiple peripheral devices based on receiving respective peripheral-initiated CMU requests from each peripheral of the multiple peripheral devices. In some aspects, the central device may reallocate a first portion of peripheral devices transmitting a peripheral-initiated CMU request, where each peripheral of the first portion of peripheral devices is reallocated to a respective new subframe having a corresponding subframe channel map that is the closest match to each peripheral's updated channel map. A second portion of peripheral devices transmitting a peripheral-initiated CMU request can receive subframe-specific CMUs that update the subframe channel map of the subframe allocated to the peripherals, without reallocating the peripherals to a new or different subframe.

Figure 7:
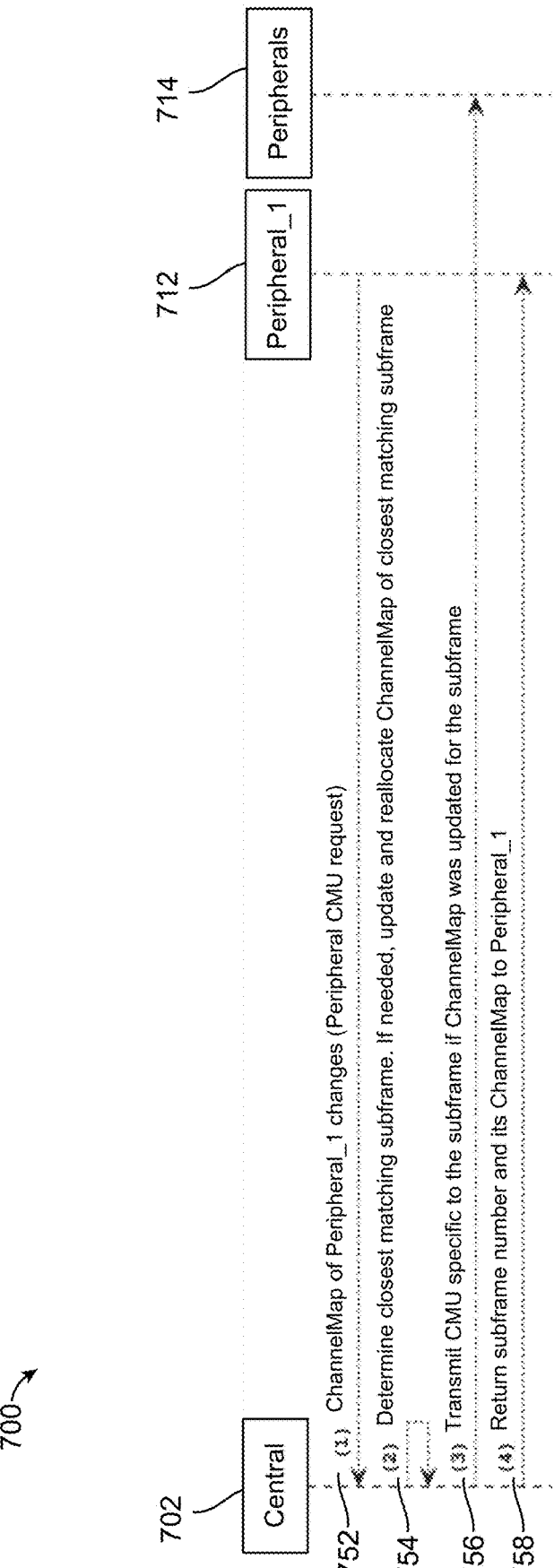
FIG. 7 is a signaling diagram illustrating an example of a channel map update process performed based on an updated channel map associated with a peripheral device, in accordance with some examples.

FIG. 7 is a signaling diagram illustrating an example of a channel map update (CMU) process 700 performed based on an update to a peripheral channel map corresponding to a peripheral device, in accordance with some examples. In some aspects, the central device 702 of FIG. 7 can be the same as or similar to one or more of the central device 502 of FIG. 5 and/or the central device 602 of FIG. 6. In some cases, the first peripheral (e.g., "Peripheral_1") 712 of FIG. 7 can be the same as or similar to the first peripheral 512 of FIG. 5 and/or the peripheral 612 of FIG. 6. In some aspects, the second peripheral (e.g., "Peripheral_2") 714 of FIG. 7 can be the same as or similar to the second peripheral 514 of FIG. 5 and/or the peripheral 612 of FIG. 6.

At block 752, the first peripheral 712 can determine an updated peripheral channel map based on one or more previously suitable channels becoming unsuitable for use by first peripheral 712 and/or based on one or more previously unsuitable channels becoming suitable for use by first peripheral 712 (e.g., as described above). Based on determining an update to its peripheral channel map, first peripheral 712 can transmit a CMU request to central device 702 (e.g., at block 752, first peripheral 712 determines an update to its peripheral channel map and transmits a peripheral-initiated CMU request indicative of the updated peripheral channel map).

At block 754, the central device 702 can determine the closest matching subframe having a subframe channel map that includes a greatest number or quantity of channels that are also included in the updated peripheral channel map. The channels included in the updated peripheral channel map can be determined by central device 702 based on peripheral channel map information in the CMU request received from first peripheral 712 by central device 702 at block 752. The closest matching subframe can additionally have a subframe channel map that does not include any channels that are indicated as being unsuitable for use by first peripheral 712 (e.g., indicated in the peripheral channel map information in the CMU request received from first peripheral 712 by central device 702 at block 752). In some examples, the central device may pick up an existing subframe where there is some overlap between the peripheral's reported channel classification and the subframe channel map. The closest matching subframe that may be determined at block 754 can be determined as described above with respect to onboarding process 500 of FIG. 5.

In some cases, at block 754 the central device 702 may update and reallocate the corresponding subframe channel map of the closest matching subframe that is determined by central device 702 for the updated peripheral channel map information. For example, the closest matching subframe may provide a partial match with the updated peripheral channel map (e.g., based on the closest matching subframe having a corresponding subframe channel map that includes a quantity or percentage of overlapping channels with the updated peripheral channel map that is less than a threshold). In such cases, the central device 702 can update and reallocate the corresponding subframe channel map of the closest matching subframe to have a quantity or percentage of overlapping channels with the updated peripheral channel map that is greater than or equal to the threshold.

In examples where central device 702 determines an updated subframe channel map at block 752 (e.g., in examples where the first peripheral 712 remains allocated to its current subframe and the subframe channel map for the current subframe is updated, or in examples where the first peripheral 712 is reallocated to a different subframe and the subframe channel map for the different subframe is also updated), at block 756 central device 702 can transmit a subframe-specific CMU that is indicative of the updated subframe channel map for the subframe. The updated subframe channel map is transmitted to the first peripheral 712 at block 758 (e.g., the peripheral associated with the peripheral-initiated CMU request of block 752). In one illustrative example, the updated subframe channel map at block 756 is transmitted from the central device 702 to the one or more peripherals 714. The one or more peripherals 714 can be peripheral devices that are included in the same group as first peripheral 712 (e.g., allocated to the same subframe as first peripheral 712).

In examples where the subframe CMU is associated with the first peripheral 712's current subframe (e.g., the subframe channel map is updated without reallocating the first peripheral 712 to a new subframe), the subframe-specific CMU of block 756 can be transmitted to the group of peripherals 714 that are also allocated to the first peripheral 712's current subframe.

In examples where the subframe CMU is associated with a different subframe that the first peripheral 712 is reallocated to (e.g., the first peripheral 712 is reallocated to a different subframe, and the corresponding subframe channel map of the different subframe is updated), the subframe-specific CMU of block 756 can be transmitted to the group of peripherals 714 that are also allocated to the different subframe (e.g., the first peripheral 712's new subframe after the update).

At block 758, central device 702 can return (e.g., transmit) the subframe number or other identifier associated with the subframe and the corresponding updated channel map to first peripheral 712. In some aspects, central device 702 can perform block 758 based on the peripheral-initiated CMU request of block 752 including a request for first peripheral 712 to change its group (e.g., be reallocated to a different subframe). In some examples, central device 702 can perform block 758 when first peripheral 712 is reallocated to a different subframe and when first peripheral 712 remains allocated to its current subframe. In examples where first peripheral 712 remains allocated to its current subframe (e.g., the current subframe channel map is updated using a subframe-specific CMU, but first peripheral 712 is not reallocated to a different group or subframe), the first peripheral 712 can be configured to ignore the transmission from central device 702 at block 758.

In some aspects, the central device can perform a group change request for each peripheral allocated to a particular subframe. For instance, based on a Central channel map update and/or a peripheral channel map update, the central device can collect a plurality of observations within a given group of peripherals (e.g., within a given group of peripherals allocated to the same particular subframe). In some cases, up to 255 peripheral devices may be allocated to the same particular subframe, and the central device can receive up to 255 channel classification information reports from the up to 255 peripheral devices allocated to the particular subframe. A particular subframe can include or be associated with 11 response slots, where a peripheral device (e.g., ESL) sending an updated channel map may utilize or pick random slots out of the 11 different response slots within the particular subframe to transmit the updated channel map message to the central device (e.g., AP).

In some examples, the central device can receive channel classification information reports from at least a portion of the peripheral devices associated with a particular subframe for at least six consecutive subframes. The channel classification information reports can be included in peripheral-initiated CMU requests and/or can be transmitted as standalone messages (e.g., as a PAwR response from the peripherals to the central device). In some examples, the receipt of messages including or indicative of channel classification information reports can be implemented or controlled by the central device. For instance, the central device can initiate the process of channel classification information reports using one or more AP Sync commands, etc. In some aspects, the six consecutive subframes can be the same subframe slot within six consecutive PAwR frames (e.g., the same 12.5 ms subframe slot in each of six consecutive 1.6 s PAwR frames) and/or can be in a randomly-selected, different subframe slot for some (or all) of the six consecutive PAwR frames. In some cases, a peripheral device may (e.g., based on an acknowledgement from the central device or AP in a next AP Sync message for the same subframe), may cease, discontinue, stop, etc. the retrials. In some examples, a subframe change request identifier can be included in a request for the central device (e.g., AP) to ignore retransmissions. In some aspects, the quantity of consecutive subframes can be determines based on a sync-loss network parameter associated with the central device and the peripheral devices. For instance, a sync-loss parameter with a value of six indicates that a peripheral becomes un-synchronized (e.g., unsubscribed) from a central device after failing to receive and acknowledge an AP Sync command from the central device for six consecutive subframes. In some aspects, the central device can receive the channel classification information reports and/or peripheral-initiated CMU requests for a quantity of consecutive subframes that is less than or equal to the network sync-loss parameter value.

Based on the received channel classification information reports from the peripherals associated with a particular subframe, the central device can determine a consistency associated with messages transmitted to and/or from the peripherals allocated to the particular subframe. For instance, if the central device does not receive a response from a peripheral for three out of six consecutive subframes, the central device may determine that it is likely that three of the channels used by the peripheral (e.g., based on the peripheral channel map) did not match with the respective channels used by the central device during the three subframes where the misses occurred. For example, the central device may not receive a response from a peripheral for three out of the six consecutive subframes based on the peripheral missing the three corresponding PAs transmitted by the central device on the three subframes where the misses occurred.

Subframes in which a miss occurs for a peripheral device can indicate to the central device that RF channel conditions between the central device and the peripheral device may have deteriorated and become unsuitable for use for communication. In some aspects, the central device can determine a group change request for one or more peripherals of each subframe (e.g., of the plurality of PAwR subframes) that have a miss rate above a threshold. The miss rate can be determined over a window that is less than or equal to the quantity of consecutive subframes associated with the sync-loss parameter value. For example, the one or more peripherals in each subframe that have a miss rate above a threshold, where the miss rate is measured over six consecutive subframes or fewer, can be reallocated to a new subframe based on a group change request initiated by the central device for the one or more peripherals.

In some aspects, if the corresponding subframe channel map of any subframe is changed (e.g., changed at the central device), the central device can share the updated subframe channel map to each peripheral device that is allocated to that subframe. For instance, every time a subframe channel map is changed at the central device, the central device can transmit a subframe-specific CMU indicating the updated channel map to each peripheral allocated to the subframe.

In some aspects, if the Central channel map (e.g., the channel map corresponding to the central device) is changed, the corresponding subframe channel maps of each subframe (e.g., of the plurality of subframes associated with the PAwR train of the central device) impacted by the update can be updated and indicated using respective subframe-specific CMUs transmitted by the central device.

FIG. 8 is a flow chart illustrating an example of a process 800 for wireless communications. The process 800 can be performed by a network entity (e.g., such as an access point, PAwR central device, etc.) or by a component or system (e.g., a chipset) thereof. The operations of the process 800 may be implemented as software components that are executed and run on one or more processors (e.g., processor 1010 of FIG. 10 or other processor(s)). Further, the transmission and reception of signals by the network entity in the process 800 may be enabled, for example, by one or more antennas and/or one or more transceivers (e.g., wireless transceiver(s)).

At block 802, the network entity (or component thereof) can receive, from a first wireless communication device, first channel map information of the first wireless communication device, wherein the first channel map information includes one or more channels associated with the first wireless communication device. For instance, the first wireless communication device can be the same as or similar to the peripheral device 512 of FIG. 5, the peripheral device 612 of FIG. 6, and/or the peripheral device 712 of FIG. 7. In some cases, the first channel map information can be received in block 554 of FIG. 5.

At block 804, the network entity (or component thereof) can allocate the first wireless communication device to a particular subframe of a plurality of subframes based on comparing the one or more channels included in the first channel map information to one or more channels included in a subframe channel map of the particular subframe. For instance, block 804 of FIG. 8 can be the same as or similar to one or more of blocks 556 and/or 558 of FIG. 5.

In some cases, the network entity (e.g., central device 502 of FIG. 5, central device 602 of FIG. 6, and/or central device 702 of FIG. 7) can allocate the first wireless communication device to the particular subframe by comparing the first channel map information to a respective subframe channel map associated with each subframe of the plurality of subframes, and determining the particular subframe as a subframe of the plurality of subframes that is associated with a respective subframe channel map including a greatest number or quantity of channels that are included in the first channel map information.

In some cases, the subframe channel map of the particular subframe includes a greatest number or quantity of channels that are included in the first channel map information and does not include one or more channels that are excluded from the first channel map information.

In some examples, the one or more channels included in the first channel map information are radio frequency (RF) channels suitable for communications with the first wireless communication device, and the one or more channels that are excluded from the first channel map information are RF channels unsuitable for communications with the first wireless communication device.

At block 806, the network entity (or component thereof) can transmit, to the first wireless communication device, an identifier of the particular subframe and the subframe channel map. For instance, block 806 can be the same as or similar to the block 558 of FIG. 5.

At block 808, the network entity (or component thereof) can receive, from the first wireless communication device, a periodic advertisement (PA) response using a channel included in the subframe channel map of the particular subframe.

In some examples, the network entity (or component thereof) can receive, from a second wireless communication device, second channel map information of the second wireless communication device. In some cases, the second channel map information includes one or more channels associated with the second wireless communication device and different from the one or more channels associated with the first wireless communication device.

For instance, the second wireless communication device can be the same as or similar to the second peripheral device 514 of FIG. 5 and/or the second peripheral device 714 of FIG. 7. In some cases, the network entity (e.g., central device) can determine an empty subframe of the plurality of subframes, wherein the empty subframe is not associated with a wireless communication device. The network entity can determine a second subframe channel map for the empty subframe, wherein each channel of one or more channels included in the second subframe channel map is included in the second channel map information and is included in a central channel map of the network entity. In some cases, the network entity can allocate the second wireless communication device to the empty subframe.

In some examples, allocating the second wireless communication device to the empty subframe is based on transmitting, to the second wireless communication device, an identifier of the empty subframe and the second subframe channel map. In some cases, the network entity can determine the empty subframe based on a quantity of overlapping channels included in the second channel map information and a respective subframe channel map of each subframe of the plurality of subframes being less than a threshold.

In some examples, the network entity (or component thereof) can determine an update to a channel map of the network entity, wherein an updated channel map of the network entity includes an update to one or more channels included in the channel map of the network entity. For instance, the network entity can determine one or more subframe channel maps that include at least one channel associated with the update to the one or more channels in the updated channel map of the network entity. The network entity can transmit, to one or more wireless communication devices associated with each subframe of one or more subframes corresponding to the one or more subframe channel maps, a respective subframe channel map update (CMU).

In some examples, the network entity (or component thereof) can determine an update to a channel map of the network entity, wherein an updated channel map of the network entity includes an update to one or more channels included in the channel map of the network entity. The network entity can determine at least one channel of the updated one or more channels is included in the subframe channel map of the particular subframe. In some cases, the network entity can generate a channel map update (CMU) for the subframe channel map based on the updated channel map of the network entity and a respective channel map information of one or more wireless communication devices allocated to the particular subframe, the one or more wireless communication devices including the first wireless communication device, wherein the CMU for the subframe channel map is indicative of the at least one channel of the updated one or more channels.

In some examples, the network entity (or component thereof) can receive, from the first wireless communication device, a message indicative of a channel map update (CMU) request for the first wireless communication device, wherein the message includes an updated first channel map information of the first wireless communication device, and wherein the updated first channel map information is different from the first channel map information.

In some examples, the network entity can transmit, to the first wireless communication device, a subframe CMU indicative of an updated subframe channel map for the particular subframe, wherein the updated subframe channel map is different from the subframe channel map. For instance, the network entity can determine the updated subframe channel map based on one or more channels included in the updated first channel map information of the first wireless communication device.

In some examples, the network entity can reallocate the first wireless communication device to a selected subframe of the plurality of subframes, wherein the selected subframe is different from the particular subframe, and can transmit, to the first wireless communication device, an identifier of the selected subframe and a corresponding subframe channel map of the selected subframe.

For instance, the network entity can determine the selected subframe based on comparing one or more channels included in the updated first channel map information to one or more channels included in a respective subframe channel map of each subframe of the plurality of subframes.

In some cases, the network entity can determine an update to one or more channels of the corresponding subframe channel map of the selected subframe, the update based on one or more channels included in the updated first channel map information, and can transmit, to the first wireless communication device, a subframe CMU indicative of an updated corresponding subframe channel map of the selected subframe.

FIG. 9 is a flow chart illustrating an example of a process 900 for wireless communications. The process 900 can be performed by a wireless communication device (e.g., such as an electronic shelf label (ESL) device, a rail controller, an active BLE tracker, a PAwR peripheral device, etc.) or by a component or system (e.g., a chipset) thereof. The operations of the process 900 may be implemented as software components that are executed and run on one or more processors (e.g., processor 1010 of FIG. 10 or other processor(s)). Further, the transmission and reception of signals by the wireless communications device in the process 900 may be enabled, for example, by one or more antennas and/or one or more transceivers (e.g., wireless transceiver(s)).

At block 902, the process 900 includes transmitting, to a network entity, first channel map information of the wireless communication device, wherein the first channel map information includes one or more channels associated with the wireless communication device. For instance, the network entity can be the same as or similar to the central device 502 of FIG. 5, the central device 602 of FIG. 6, and/or the central device 702 of FIG. 7. In some cases, the wireless communication device can be the same as or similar to one or more of the peripheral device 512 or 514 of FIG. 5, the peripheral device 612 of FIG. 6, and/or the peripheral device 712 or 714 of FIG. 7.

At block 904, the process 900 includes receiving, from the network entity, an identifier of a particular subframe of a plurality of subframes and a subframe channel map of the particular subframe, wherein the wireless communication device is allocated to the particular subframe based on a comparison of the one or more channels included in the first channel map information and one or more channels included in the subframe channel map of the particular subframe.

For instance, the particular subframe can be based on a comparison of the first channel map information to a respective subframe channel map associated with each subframe of the plurality of subframes. In some cases, the particular subframe is a subframe of the plurality of subframes that is associated with a respective subframe channel map including a greatest number or quantity of channels that are included in the first channel map information.

In some examples, the subframe channel map of the particular subframe includes a greatest number or quantity of channels that are included in the first channel map information and does not include one or more channels that are excluded from the first channel map information.

In some examples, the one or more channels included in the first channel map information are radio frequency (RF) channels suitable for communications with the network entity, and the one or more channels that are excluded from the first channel map information are RF channels unsuitable for communications with the network entity.

At block 906, the process 900 includes transmitting, to the network entity, a periodic advertisement (PA) response using a channel included in the subframe channel map of the particular subframe. For instance, the wireless communication device can receive, from the network entity, a respective subframe channel map update (CMU) indicative of an update to a channel map of the network entity and one or more corresponding updates to one or more subframe channel maps that include at least one channel associated with the update to the channel map of the network entity.

In some examples, the process 900 can further include transmitting, to the network entity, a message indicative of a channel map update (CMU) request for the wireless communication device. For instance, the message can include an updated first channel map information of the wireless communication device, and wherein the updated first channel map information is different from the first channel map information.

In some examples, the wireless communication device can receive, from the network entity, a subframe CMU indicative of an updated subframe channel map for the particular subframe, wherein the updated subframe channel map is different from the subframe channel map. For instance, the wireless communication device can receive the updated subframe channel map based on one or more channels included in the updated first channel map information of the wireless communication device. In some cases, the wireless communication device can receive, from the network entity, an identifier of a selected subframe of the plurality of subframes and a corresponding subframe channel map of the selected subframe.

In some examples, the selected subframe is a reallocated subframe for the wireless communication device, wherein the selected subframe is different from the particular subframe. In some cases, the selected subframe is based on comparing one or more channels included in the updated first channel map information to one or more channels included in a respective subframe channel map of each subframe of the plurality of subframes. In some cases, the wireless communication device can receive, from the network entity, a subframe CMU indicative of an updated corresponding subframe channel map of the selected subframe.

The network entity, network device, and/or the wireless communication device may include various components, such as one or more input devices, one or more output devices, one or more processors, one or more microprocessors, one or more microcomputers, one or more cameras, one or more sensors, one or more receivers, transmitters, and/or transceivers, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of a device configured to perform the process 800 of FIG. 8 and/or the process 900 of FIG. 9 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 800 and 900 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 800, 900, and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
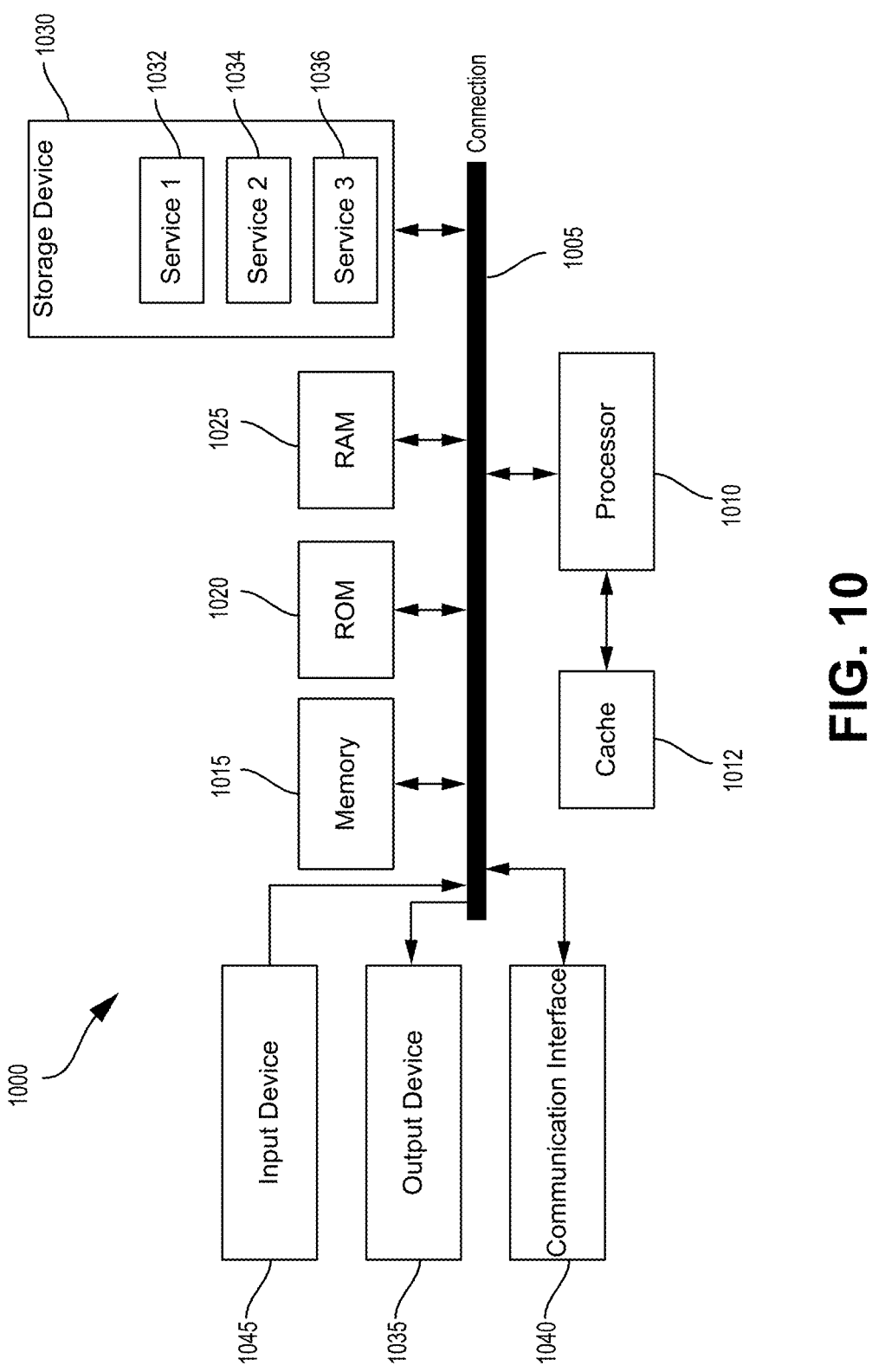
FIG. 10 is a block diagram illustrating an example of a computing system, which may be employed by the disclosed systems and techniques, in accordance with some examples.

FIG. 10 is a block diagram illustrating an example of a computing system 1000, which may be employed by the disclosed systems and techniques. In particular, FIG. 10 illustrates an example of computing system 1000, which can be, for example, any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some aspects, computing system 1000 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1000 includes at least one processing unit (CPU or processor) 1010 and connection 1005 that communicatively couples various system components including system memory 1015, such as read-only memory (ROM) 1020 and random-access memory (RAM) 1025 to processor 1010. Computing system 1000 can include a cache 1012 of high-speed memory connected directly with, in close proximity to, or integrated as part of processor 1010.

Processor 1010 can include any general-purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000.

Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1040 may also include one or more range sensors (e.g., LIDAR sensors, laser range finders, RF radars, ultrasonic sensors, and infrared (IR) sensors) configured to collect data and provide measurements to processor 1010, whereby processor 1010 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based GPS, the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some aspects, a hardware service that performs a particular function can include the software component stored in a computer-readable medium in connection with the necessary hardware components, such as processor 1010, connection 1005, output device 1035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1. A network entity for wireless communications, the network entity comprising: at least one memory; and at least one processor coupled to the at least one memory and configured to: receive, from a first wireless communication device, first channel map information of the first wireless communication device, wherein the first channel map information includes one or more channels associated with the first wireless communication device; allocate the first wireless communication device to a particular subframe of a plurality of subframes based on comparing the one or more channels included in the first channel map information to one or more channels included in a subframe channel map of the particular subframe; transmit, to the first wireless communication device, an identifier of the particular subframe and the subframe channel map; and receive, from the first wireless communication device, a periodic advertisement (PA) response using a channel included in the subframe channel map of the particular subframe.

Aspect 2. The network entity of Aspect 1, wherein, to allocate the first wireless communication device to the particular subframe, the at least one processor is configured to: compare the first channel map information to a respective subframe channel map associated with each subframe of the plurality of subframes; and determine the particular subframe as a subframe of the plurality of subframes that is associated with a respective subframe channel map including a greatest number of channels that are included in the first channel map information.

Aspect 3. The network entity of any of Aspects 1 to 2, wherein the subframe channel map of the particular subframe includes a greatest number of channels that are included in the first channel map information and does not include one or more channels that are excluded from the first channel map information.

Aspect 4. The network entity of Aspect 3, wherein: the one or more channels included in the first channel map information are radio frequency (RF) channels suitable for communications with the first wireless communication device; and the one or more channels that are excluded from the first channel map information are RF channels unsuitable for communications with the first wireless communication device.

Aspect 5. The network entity of any of Aspects 1 to 4, wherein the at least one processor is further configured to: receive, from a second wireless communication device, second channel map information of the second wireless communication device, wherein the second channel map information includes one or more channels associated with the second wireless communication device and different from the one or more channels associated with the first wireless communication device; determine an empty subframe of the plurality of subframes, wherein the empty subframe is not associated with a wireless communication device; determine a second subframe channel map for the empty subframe, wherein each channel of one or more channels included in the second subframe channel map is included in the second channel map information and is included in a central channel map of the network entity; and allocate the second wireless communication device to the empty subframe.

Aspect 6. The network entity of Aspect 5, wherein, to allocate the second wireless communication device to the empty subframe, the at least one processor is configured to: transmit, to the second wireless communication device, an identifier of the empty subframe and the second subframe channel map.

Aspect 7. The network entity of Aspect 6, wherein the at least one processor is configured to determine the empty subframe based on a number of overlapping channels included in the second channel map information and a respective subframe channel map of each subframe of the plurality of subframes being less than a threshold.

Aspect 8. The network entity of any of Aspects 1 to 7, wherein the at least one processor is further configured to: determine an update to a channel map of the network entity, wherein an updated channel map of the network entity includes an update to one or more channels included in the channel map of the network entity; determine one or more subframe channel maps that include at least one channel associated with the update to the one or more channels in the updated channel map of the network entity; and transmit, to one or more wireless communication devices associated with each subframe of one or more subframes corresponding to the one or more subframe channel maps, a respective subframe channel map update (CMU).

Aspect 9. The network entity of any of Aspects 1 to 8, wherein the at least one processor is further configured to: determine an update to a channel map of the network entity, wherein an updated channel map of the network entity includes an update to one or more channels included in the channel map of the network entity; determine at least one channel of the updated one or more channels is included in the subframe channel map of the particular subframe; and generate a channel map update (CMU) for the subframe channel map based on the updated channel map of the network entity and a respective channel map information of one or more wireless communication devices allocated to the particular subframe, the one or more wireless communication devices including the first wireless communication device, wherein the CMU for the subframe channel map is indicative of the at least one channel of the updated one or more channels.

Aspect 10. The network entity of any of Aspects 1 to 9, wherein the at least one processor is further configured to: receive, from the first wireless communication device, a message indicative of a channel map update (CMU) request for the first wireless communication device, wherein the message includes an updated first channel map information of the first wireless communication device, and wherein the updated first channel map information is different from the first channel map information.

Aspect 11. The network entity of Aspect 10, wherein the at least one processor is further configured to: transmit, to the first wireless communication device, a subframe CMU indicative of an updated subframe channel map for the particular subframe, wherein the updated subframe channel map is different from the subframe channel map.

Aspect 12. The network entity of Aspect 11, wherein the at least one processor is configured to determine the updated subframe channel map based on one or more channels included in the updated first channel map information of the first wireless communication device.

Aspect 13. The network entity of any of Aspects 10 to 12, wherein the at least one processor is further configured to: reallocate the first wireless communication device to a selected subframe of the plurality of subframes, wherein the selected subframe is different from the particular subframe; and transmit, to the first wireless communication device, an identifier of the selected subframe and a corresponding subframe channel map of the selected subframe.

Aspect 14. The network entity of Aspect 13, wherein the at least one processor is configured to determine the selected subframe based on comparing one or more channels included in the updated first channel map information to one or more channels included in a respective subframe channel map of each subframe of the plurality of subframes.

Aspect 15. The network entity of any of Aspects 13 to 14, wherein the at least one processor is further configured to: determine an update to one or more channels of the corresponding subframe channel map of the selected subframe, the update based on one or more channels included in the updated first channel map information; and transmit, to the first wireless communication device, a subframe CMU indicative of an updated corresponding subframe channel map of the selected subframe.

Aspect 16. A wireless communication device for wireless communications, the wireless communication device comprising: at least one memory; and at least one processor coupled to the at least one memory and configured to: transmit, to a network entity, first channel map information of the wireless communication device, wherein the first channel map information includes one or more channels associated with the wireless communication device; receive, from the network entity, an identifier of a particular subframe of a plurality of subframes and a subframe channel map of the particular subframe, wherein the wireless communication device is allocated to the particular subframe based on a comparison of the one or more channels included in the first channel map information and one or more channels included in the subframe channel map of the particular subframe; and transmit, to the network entity, a periodic advertisement (PA) response using a channel included in the subframe channel map of the particular subframe.

Aspect 17. The wireless communication device of Aspect 16, wherein the particular subframe is based on a comparison of the first channel map information to a respective subframe channel map associated with each subframe of the plurality of subframes; and the particular subframe is a subframe of the plurality of subframes that is associated with a respective subframe channel map including a greatest number of channels that are included in the first channel map information.

Aspect 18. The wireless communication device of any of Aspects 16 to 17, wherein the subframe channel map of the particular subframe includes a greatest number of channels that are included in the first channel map information and does not include one or more channels that are excluded from the first channel map information.

Aspect 19. The wireless communication device of Aspect 18, wherein: the one or more channels included in the first channel map information are radio frequency (RF) channels suitable for communications with the network entity; and the one or more channels that are excluded from the first channel map information are RF channels unsuitable for communications with the network entity.

Aspect 20. The wireless communication device of any of Aspects 16 to 19. wherein the at least one processor is further configured to: receive, from the network entity, a respective subframe channel map update (CMU) indicative of an update to a channel map of the network entity and one or more corresponding updates to one or more subframe channel maps that include at least one channel associated with the update to the channel map of the network entity.

Aspect 21. The wireless communication device of any of Aspects 16 to 20, wherein the at least one processor is further configured to: transmit, to the network entity, a message indicative of a channel map update (CMU) request for the wireless communication device.

Aspect 22. The wireless communication device of Aspect 21, wherein the message includes an updated first channel map information of the wireless communication device, and wherein the updated first channel map information is different from the first channel map information.

Aspect 23. The wireless communication device of any of Aspects 21 to 22, wherein the at least one processor is further configured to: receive, from the network entity, a subframe CMU indicative of an updated subframe channel map for the particular subframe, wherein the updated subframe channel map is different from the subframe channel map.

Aspect 24. The wireless communication device of any of Aspects 22 to 23, wherein the at least one processor is configured to receive the updated subframe channel map based on one or more channels included in the updated first channel map information of the wireless communication device.

Aspect 25. The wireless communication device of any of Aspects 22 to 24, wherein the at least one processor is further configured to: receive, from the network entity, an identifier of a selected subframe of the plurality of subframes and a corresponding subframe channel map of the selected subframe.

Aspect 26. The wireless communication device of Aspect 25, wherein the selected subframe is a reallocated subframe for the wireless communication device, wherein the selected subframe is different from the particular subframe.

Aspect 27. The wireless communication device of any of Aspects 25 to 26, wherein the selected subframe is based on comparing one or more channels included in the updated first channel map information to one or more channels included in a respective subframe channel map of each subframe of the plurality of subframes.

Aspect 28. The wireless communication device of any of Aspects 25 to 27, wherein the at least one processor is further configured to: receive, from the network entity, a subframe CMU indicative of an updated corresponding subframe channel map of the selected subframe.

Aspect 29. A method for wireless communications of a network entity, the method comprising: receiving, from a first wireless communication device, first channel map information of the first wireless communication device, wherein the first channel map information includes one or more channels associated with the first wireless communication device; allocating the first wireless communication device to a particular subframe of a plurality of subframes based on comparing the one or more channels included in the first channel map information to one or more channels included in a subframe channel map of the particular subframe; transmitting, to the first wireless communication device, an identifier of the particular subframe and the subframe channel map; and receiving, from the first wireless communication device, a periodic advertisement (PA) response using a channel included in the subframe channel map of the particular subframe.

Aspect 30. A method for wireless communications of a wireless communication device, the method comprising: transmitting, to a network entity, first channel map information of the wireless communication device, wherein the first channel map information includes one or more channels associated with the wireless communication device; receiving, from the network entity, an identifier of a particular subframe of a plurality of subframes and a subframe channel map of the particular subframe, wherein the wireless communication device is allocated to the particular subframe based on a comparison of the one or more channels included in the first channel map information and one or more channels included in the subframe channel map of the particular subframe; and transmitting, to the network entity, a periodic advertisement (PA) response using a channel included in the subframe channel map of the particular subframe.

Aspect 31. A non-transitory computer-readable storage medium comprising instructions stored thereon which, when executed by at least one processor, causes the at least one processor to perform operations according to any of Aspects 1 to 15.

Aspect 32. A non-transitory computer-readable storage medium comprising instructions stored thereon which, when executed by at least one processor, causes the at least one processor to perform operations according to any of Aspects 16 to 28.

Aspect 33. A non-transitory computer-readable storage medium comprising instructions stored thereon which, when executed by at least one processor, causes the at least one processor to perform operations according to Aspect 29.

Aspect 34. A non-transitory computer-readable storage medium comprising instructions stored thereon which, when executed by at least one processor, causes the at least one processor to perform operations according to Aspect 30.

Aspect 35. An apparatus comprising one or more means for performing operations according to any of Aspects 1 to 15.

Aspect 36. An apparatus comprising one or more means for performing operations according to any of Aspects 16 to 28.

Aspect 37. An apparatus comprising one or more means for performing operations according to Aspect 29.

Aspect 38. An apparatus comprising one or more means for performing operations according to Aspect 30.

What is claimed is:

1. A network entity for wireless communications, the network entity comprising:
at least one memory; and
at least one processor coupled to the at least one memory and configured to:
   receive, from a first wireless communication device, first channel map information of the first wireless communication device, wherein the first channel map information includes one or more channels associated with the first wireless communication device;
   allocate the first wireless communication device to a particular subframe of a plurality of subframes based on comparing the one or more channels included in the first channel map information to one or more channels included in a subframe channel map of the particular subframe;
   transmit, to the first wireless communication device, an identifier of the particular subframe and the subframe channel map;
   receive, from the first wireless communication device, a periodic advertisement (PA) response using a channel included in the subframe channel map of the particular subframe; and
   receive, from the first wireless communication device, a message indicative of a channel map update (CMU) request for the first wireless communication device, wherein the message includes an updated first channel map information of the first wireless communication device, and wherein the updated first channel map information is different from the first channel map information.

2. The network entity of claim 1, wherein, to allocate the first wireless communication device to the particular subframe, the at least one processor is configured to:
compare the first channel map information to a respective subframe channel map associated with each subframe of the plurality of subframes; and
determine the particular subframe as a subframe of the plurality of subframes that is associated with a respective subframe channel map including a greatest number of channels that are included in the first channel map information.

3. The network entity of claim 1, wherein the subframe channel map of the particular subframe includes a greatest number of channels that are included in the first channel map information and does not include one or more channels that are excluded from the first channel map information.

4. The network entity of claim 3, wherein:
the one or more channels included in the first channel map information are radio frequency (RF) channels suitable for communications with the first wireless communication device; and
the one or more channels that are excluded from the first channel map information are RF channels unsuitable for communications with the first wireless communication device.

5. The network entity of claim 1, wherein the at least one processor is further configured to:
receive, from a second wireless communication device, second channel map information of the second wireless communication device, wherein the second channel map information includes one or more channels associated with the second wireless communication device and different from the one or more channels associated with the first wireless communication device;

determine an empty subframe of the plurality of subframes, wherein the empty subframe is not associated with a wireless communication device;

determine a second subframe channel map for the empty subframe, wherein each channel of one or more channels included in the second subframe channel map is included in the second channel map information and is included in a central channel map of the network entity; and allocate the second wireless communication device to the empty subframe.

6. The network entity of claim 5, wherein, to allocate the second wireless communication device to the empty subframe, the at least one processor is configured to:

transmit, to the second wireless communication device, an identifier of the empty subframe and the second subframe channel map.

7. The network entity of claim 6, wherein the at least one processor is configured to determine the empty subframe based on a number of overlapping channels included in the second channel map information and a respective subframe channel map of each subframe of the plurality of subframes being less than a threshold.

8. The network entity of claim 1, wherein the at least one processor is further configured to:

determine an update to a channel map of the network entity, wherein an updated channel map of the network entity includes an update to one or more channels included in the channel map of the network entity;

determine one or more subframe channel maps that include at least one channel associated with the update to the one or more channels in the updated channel map of the network entity; and transmit a respective subframe channel map update (CMU) to each wireless communication device of one or more wireless communication devices, wherein each wireless communication device of the one or more wireless communication devices is associated with a respective subframe of one or more subframes corresponding to the one or more subframe channel maps.

9. The network entity of claim 1, wherein the at least one processor is further configured to:

determine an update to a channel map of the network entity, wherein an updated channel map of the network entity includes an update to one or more channels included in the channel map of the network entity;

determine at least one channel of the updated one or more channels is included in the subframe channel map of the particular subframe; and generate a channel map update (CMU) for the subframe channel map based on the updated channel map of the network entity and a respective channel map information of one or more wireless communication devices allocated to the particular subframe, the one or more wireless communication devices including the first wireless communication device, wherein the CMU for the subframe channel map is indicative of the at least one channel of the updated one or more channels.

10. The network entity of claim 1, wherein the at least one processor is further configured to:

transmit, to the first wireless communication device, a subframe CMU indicative of an updated subframe channel map for the particular subframe, wherein the updated subframe channel map is different from the subframe channel map.

11. The network entity of claim 10, wherein the at least one processor is configured to determine the updated subframe channel map based on one or more channels included in the updated first channel map information of the first wireless communication device.

12. The network entity of claim 1, wherein the at least one processor is further configured to:

reallocate the first wireless communication device to a selected subframe of the plurality of subframes, wherein the selected subframe is different from the particular subframe; and transmit, to the first wireless communication device, an identifier of the selected subframe and a corresponding subframe channel map of the selected subframe.

13. The network entity of claim 12, wherein the at least one processor is configured to determine the selected subframe based on comparing one or more channels included in the updated first channel map information to one or more channels included in a respective subframe channel map of each subframe of the plurality of subframes.

14. The network entity of claim 12, wherein the at least one processor is further configured to:

determine an update to one or more channels of the corresponding subframe channel map of the selected subframe, the update based on one or more channels included in the updated first channel map information; and transmit, to the first wireless communication device, a subframe CMU indicative of an updated corresponding subframe channel map of the selected subframe.

15. A wireless communication device for wireless communications, the wireless communication device comprising:

at least one memory; and at least one processor coupled to the at least one memory and configured to:

transmit, to a network entity, first channel map information of the wireless communication device, wherein the first channel map information includes one or more channels associated with the wireless communication device;

receive, from the network entity, an identifier of a particular subframe of a plurality of subframes and a subframe channel map of the particular subframe, wherein the wireless communication device is allocated to the particular subframe based on a comparison of the one or more channels included in the first channel map information and one or more channels included in the subframe channel map of the particular subframe;

transmit, to the network entity, a periodic advertisement (PA) response using a channel included in the subframe channel map of the particular subframe; and transmit, to the network entity, a message indicative of a channel map update (CMU) request for the wireless communication device.

16. The wireless communication device of claim 15, wherein:

the particular subframe is based on a comparison of the first channel map information to a respective subframe channel map associated with each subframe of the plurality of subframes; and the particular subframe is a subframe of the plurality of subframes that is associated with a respective subframe channel map including a greatest number of channels that are included in the first channel map information.

17. The wireless communication device of claim 15, wherein the subframe channel map of the particular subframe includes a greatest number of channels that are included in the first channel map information and does not include one or more channels that are excluded from the first channel map information.

18. The wireless communication device of claim 17, wherein:

the one or more channels included in the first channel map information are radio frequency (RF) channels suitable for communications with the network entity; and the one or more channels that are excluded from the first channel map information are RF channels unsuitable for communications with the network entity.

19. The wireless communication device of claim 15, wherein the at least one processor is further configured to:

receive, from the network entity, a respective subframe channel map update (CMU) indicative of an update to a channel map of the network entity and one or more corresponding updates to one or more subframe channel maps that include at least one channel associated with the update to the channel map of the network entity.

20. The wireless communication device of claim 15, wherein the message includes an updated first channel map information of the wireless communication device, and wherein the updated first channel map information is different from the first channel map information.

21. The wireless communication device of claim 20, wherein the at least one processor is further configured to:

receive, from the network entity, an identifier of a selected subframe of the plurality of subframes and a corresponding subframe channel map of the selected subframe.

22. The wireless communication device of claim 21, wherein the selected subframe is a reallocated subframe for the wireless communication device, wherein the selected subframe is different from the particular subframe.

23. The wireless communication device of claim 21, wherein the selected subframe is based on comparing one or more channels included in the updated first channel map information to one or more channels included in a respective subframe channel map of each subframe of the plurality of subframes.

24. The wireless communication device of claim 21, wherein the at least one processor is further configured to:

receive, from the network entity, a subframe CMU indicative of an updated corresponding subframe channel map of the selected subframe.

25. The wireless communication device of claim 15, wherein the at least one processor is further configured to:

receive, from the network entity, a subframe CMU indicative of an updated subframe channel map for the particular subframe, wherein the updated subframe channel map is different from the subframe channel map.

26. The wireless communication device of claim 25, wherein the at least one processor is configured to receive the updated subframe channel map based on one or more channels included in the updated first channel map information of the wireless communication device.

27. A method for wireless communications of a network entity, the method comprising:

receiving, from a first wireless communication device, first channel map information of the first wireless communication device, wherein the first channel map information includes one or more channels associated with the first wireless communication device;

allocating the first wireless communication device to a particular subframe of a plurality of subframes based on comparing the one or more channels included in the first channel map information to one or more channels included in a subframe channel map of the particular subframe;

transmitting, to the first wireless communication device, an identifier of the particular subframe and the subframe channel map;

receiving, from the first wireless communication device, a periodic advertisement (PA) response using a channel included in the subframe channel map of the particular subframe; and receiving, from the first wireless communication device, a message indicative of a channel map update (CMU) request for the first wireless communication device, wherein the message includes an updated first channel map information of the first wireless communication device, and wherein the updated first channel map information is different from the first channel map information.

28. A method for wireless communications of a wireless communication device, the method comprising:

transmitting, to a network entity, first channel map information of the wireless communication device, wherein the first channel map information includes one or more channels associated with the wireless communication device;

receiving, from the network entity, an identifier of a particular subframe of a plurality of subframes and a subframe channel map of the particular subframe, wherein the wireless communication device is allocated to the particular subframe based on a comparison of the one or more channels included in the first channel map information and one or more channels included in the subframe channel map of the particular subframe;

transmitting, to the network entity, a periodic advertisement (PA) response using a channel included in the subframe channel map of the particular subframe; and transmitting, to the network entity, a message indicative of a channel map update (CMU) request for the wireless communication device.

* * * * *